(12) United States Patent
Tominaga

(10) Patent No.: US 10,963,116 B2
(45) Date of Patent: *Mar. 30, 2021

(54) DISPLAY DEVICE

(71) Applicant: Sharp Kabushiki Kaisha, Sakai (JP)

(72) Inventor: Masakatsu Tominaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,712

(22) Filed: Jan. 13, 2020

(65) Prior Publication Data

US 2020/0233533 A1   Jul. 23, 2020

Related U.S. Application Data

(60) Provisional application No. 62/793,403, filed on Jan. 17, 2019.

(51) Int. Cl.
*G06F 3/044*   (2006.01)
*G02F 1/1333*   (2006.01)
*G02F 1/1362*   (2006.01)
*G02F 1/1343*   (2006.01)
*G06F 3/041*   (2006.01)

(52) U.S. Cl.
CPC ........ *G06F 3/0446* (2019.05); *G02F 1/13338* (2013.01); *G02F 1/134363* (2013.01); *G02F 1/136286* (2013.01); *G06F 3/0412* (2013.01); *G06F 3/0443* (2019.05); *G06F 3/0445* (2019.05); *G06F 3/04164* (2019.05);
(Continued)

(58) Field of Classification Search
CPC ............ G06F 3/0412; G06F 3/04164; G06F 3/04166; G06F 3/04184; G06F 3/0443; G06F 3/044; G06F 3/0445; G06F 3/0446; G06F 2203/04101; G09G 3/2096; G09G 3/3648; G09G 3/3659; G09G 5/006; G09G 2300/0426; G09G 2310/08; G09G 2320/103; G02F 1/13338; G02F 1/134363; G02F 1/136286; G02F 1/136227; G02F 2001/134372
See application file for complete search history.

(56) References Cited

U.S. PATENT DOCUMENTS

2016/0240163 A1\* 8/2016 Yamamoto ........... G09G 3/3648
2018/0107317 A1   4/2018 Tanaka et al.
2019/0064977 A1\* 2/2019 Feng .................. G06F 3/04164

FOREIGN PATENT DOCUMENTS

JP   2018-063666 A   4/2018

\* cited by examiner

*Primary Examiner* — Nelson M Rosario

(57) ABSTRACT

A display device includes image lines, a signal source, position detecting lines, and a switch circuit. The image lines are disposed in a display area in which an image is displayed. The signal source is disposed outside the display area and connected to the image lines. The signal source is configured to supply image signals and position detecting signals to the image lines with time-division. The position detecting lines are disposed in the display area. The switch circuit is disposed on an opposite side from the signal source relative to the display area outside the display area and connected to the image lines and the position detecting lines. The switch circuit is configured to electrically connect the image lines and the position detecting lines in synchronization with feedings of the position detecting signals to the image lines by the signal source.

16 Claims, 18 Drawing Sheets

(52) U.S. Cl.
CPC .. *G02F 1/134372* (2021.01); *G02F 1/136227* (2013.01); *G06F 2203/04101* (2013.01)

DISPLAY DEVICE

CROSS REFERENCE TO RELATED APPLICATION

This application claims priority from U.S. Provisional Patent Application No. 62/793,403 filed on Jan. 17, 2019. The entire contents of the priority application are incorporated herein by reference.

TECHNICAL FIELD

The technology described herein relates to a display device.

BACKGROUND

An example of a conventional display device described in Japanese Unexamined Patent Application Publication No. 2018-63666 has been known. A display driver included in the display device includes a source output terminal, a source driver circuit, connecting lines, and a selector. The source output terminal is connected to a source input terminal of a display panel. The source driver circuit generates source signals supplied to the source input terminal. The connecting lines are configured to detect a capacitance of a conductive member connected to the input. The connecting lines are connected to the input of a capacitance detecting circuit. The capacitance detecting circuit provides the detected capacitance and generates capacitance data used for detection of touch events in which an object touches the display panel. The selector is configured to connect the source output terminal to any one of connecting options including the source driver circuit and the connecting lines.

In the display device, the switch circuit for switching connection between touch detecting electrodes and the source input terminals is disposed between the selector and the display circuit. Therefore, a width of a frame tends to increase on a selector side.

SUMMARY

The technology described herein was made in view of the above circumstances. An object is to reduce a width of a frame.

Means for Solving the Problem

A display device includes image lines, a signal source, position detecting lines, and a switch circuit. The image lines are disposed in a display area in which an image is displayed. The signal source is disposed outside the display area and connected to the image limes. The signal source is configured to supply image signals and position detecting signals to the image lines with time-divisions. The position detecting lines are disposed in the display area. The switch circuit is disposed on an opposite side from the signal source relative to the display area outside the display area and connected to the image lines and the position detecting lines. The switch circuit is configured to electrically connect the image lines and the position detecting lines in synchronization with feedings of the position detecting signals to the image lines by the signal source.

According to the technology described herein, the width of the frame can be reduced.

DETAILED DESCRIPTION

First Embodiment

Figure 1:
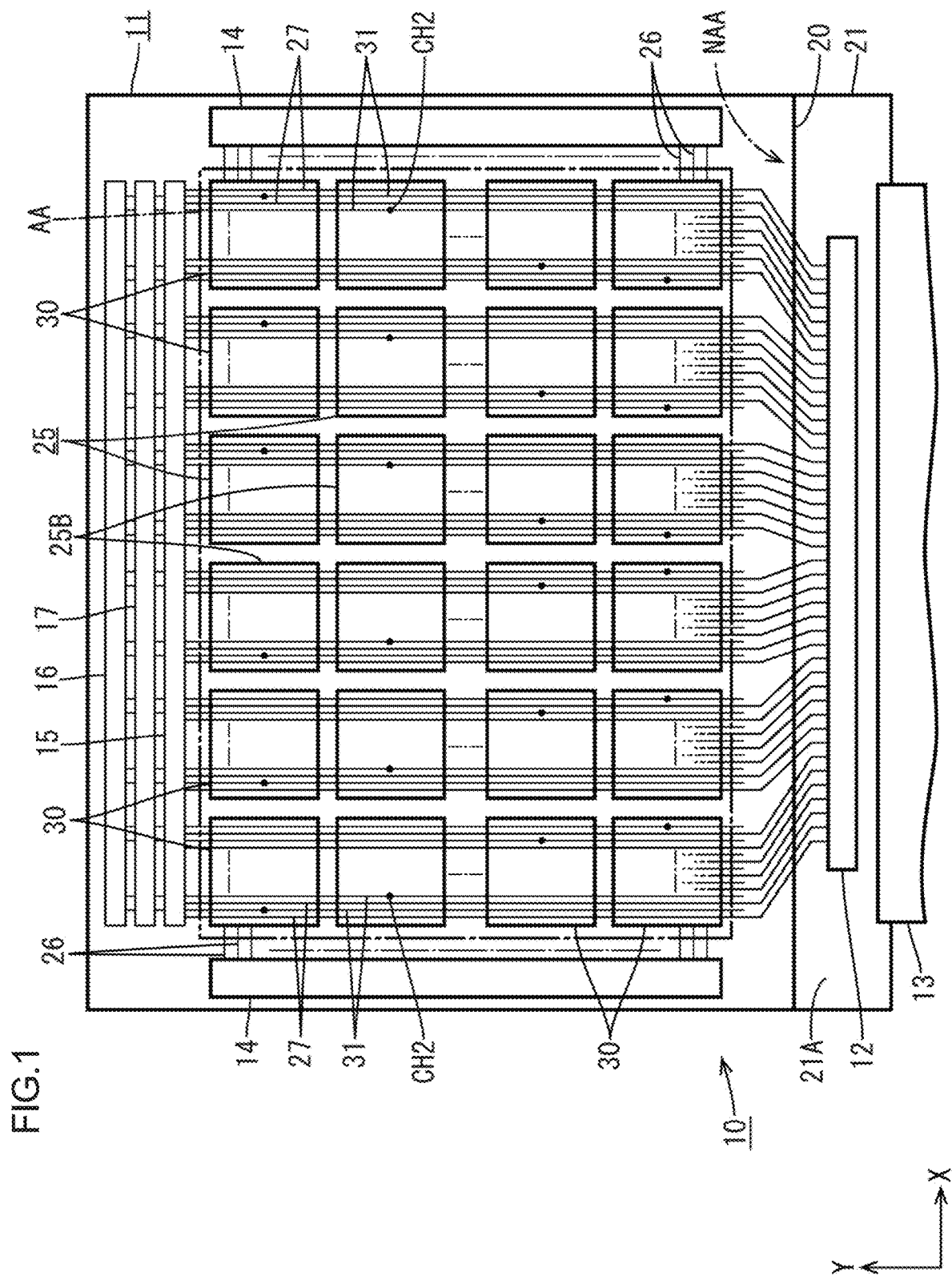
FIG. 1 is a plan view of a liquid crystal panel included in a liquid crystal display device according to a first embodiment illustrating source lines, touch electrodes, and touch lines.

A first embodiment of the technology described herein will be described in detail with reference to FIGS. 1 to 12. In this section, a liquid crystal display device 10 (a display device, a display device having an input position detecting function) having a display function and a touch panel function (a positional input function) will be described. In the drawings, X-axes, Y-axes, and Z-axes may be present. The axes in each drawing correspond to the respective axes in other drawings. An upper side and a lower side in FIGS. 3, 5, and 9 to 12 correspond with a front side and a rear side of the liquid crystal display device 10, respectively.

FIG. 1 is a schematic plan view of a liquid crystal panel 11. As illustrated in FIG. 1, the liquid crystal display device 10 has a horizontally-long rectangular and includes at least the liquid crystal panel 11 (a display device, a display pane, a display panel having an input position detecting function) and a backlight unit (a lighting device). The liquid crystal panel 11 is configured to display images. The backlight unit is an external light source configured to apply light to the liquid crystal panel 11 for image display. The backlight unit is disposed behind (on a back side of) the liquid crystal panel 11. The backlight unit includes a light source (e.g., LEDs) configured to emit white light and an optical member configured to exert optical effects on the light from the light source to convert the light into planar light.

As illustrated in FIG. 1, the liquid crystal panel 11 includes a middle area defined as a display area AA (an area defined by a chain line in FIG. 1) in which images are displayed. An outer area of a screen of the liquid crystal panel 11 having a frame shape to surround the display area AA is defined as a non-display area NAA in which the images are not displayed. The liquid crystal panel 11 includes two substrates 20 and 21 that are bonded together. One of the substrates 20 and 21 on the front side is a CF substrate 20 (an opposed substrate) and the other on the rear side (the back light) is an array substrate 21 (a display device substrate, an active matrix substrate). The CF substrate 20 and the array substrate 21 include various films stacked on inner surfaces of glass substrates. Polarizing plates are bonded to outer surfaces of the substrates 20 and 21. The CF substrate 20 has a short dimension smaller than that of the array substrate 21. The CF substrate 20 is bonded to the array substrate 21 with one of edges separated from each other in a direction along a short edge (the Y-axis direction) aligned with a corresponding edge of the array substrate 21. The other edge of the array substrate 21 on an opposite side in the direction along the short edge laterally projects from the CF substrate 20. A portion of the array substrate 21 not overlapping the CF substrate 20 is defined as a CF substrate non-overlapping portion 21A. A driver 12 (a signal source, a source driver) and a flexible substrate 13 are mounted on the CF substrate non-overlapping portion 21A. The driver 12 is configured to supply various signals related to a display function and a touch panel function, which will be described later.

The driver 12 includes an LSI chip that includes a driver circuit inside. The driver 12 is mounted on the CF substrate non-overlapping portion 21A of the array substrate 21 with the chip on glass (COG) technology and configured to process various signals transmitted by the flexible substrate 13. As illustrated in FIG. 1, the driver 12 disposed adjacent to one of edges of the display area AA in the Y-axis direction between the display area AA and the flexible substrate 13, which will be described later. The driver 12 is configured to supply various signals (specifically, image signals and touch signals) to lines (specifically, source lines 27, which will be described later) in the display area AA. The flexible substrate 13 includes a substrate made of a synthetic resin having an insulating property and flexibility (e.g., a polyimide-based resin) and a number of line patterns formed on the substrate. The flexible substrate 13 includes a first end connected to the non-display area NAA of the liquid crystal panel 11 and a second end connected to a control circuit board (a signal source). The various signals supplied by the control circuit board are transmitted to the liquid crystal panel 11 via the flexible substrate 13 and output to the display area AA after processed by the driver 12 in the non-display area NAA. In the non-display area NAA of the array substrate 21, two gate circuits 14 are disposed to sandwich the display area AA therebetween from sides with respect to the X-axis direction. The gate circuits 14 have a band shape to extend in the Y-axis direction. Two gate circuits 14 are provided to sandwich the display area AA therebetween from sides with respect to the X-axis direction. The gate circuits 14 are configured to supply the scanning signals to the lines (specifically, gate lines 26, which will be described later) in the display area AA. The gate circuits 14 are provided in a monolithic form. The gate circuits 14 include circuits configured to output the scanning signals at predefined timings and buffer circuits configured to amplify the scanning signals.

The liquid crystal panel 11 according to this embodiment has the display function and the touch panel function. The display function is for displaying images. The touch panel function is for detecting positions of inputs (input positions) by a user based on displayed images. Touch panel patterns for the touch panel function are integrated (with the in-cell technology). The touch panel patterns use a projected capacitance method. The touch panel patterns use a self-capacitance method for detection. As illustrated in FIG. 1, the touch panel patterns include touch electrodes 30 (position detecting electrodes) arranged in a matrix within a plate surface of the liquid crystal panel 11. The touch electrodes 30 are disposed in the display area AA of the liquid crystal panel 11. The display area AA of the liquid crystal panel 11 substantially corresponds with a touch area (an input position detectable area), in which positions of inputs are detectable. The non-display area NAA substantially corresponds with a non-touch area (an input position non-detectable area), in which positions of inputs are not detectable. A finger of the user is a conductive member (a position input member). When the use brings the finger closer to a surface (a display surface) of the liquid crystal panel 11 to perform a position input operation based on an image displayed in the display area AA of the liquid crystal panel 11, a capacitor is formed between the finger and the touch electrode 30. A capacitance measured at the touch electrode 30 adjacent to the finger varies as the finger approaches thereto. The capacitance becomes different from a capacitance measured at the touch electrode 30 away from the finger. Therefore, the position of input can be detected based on the difference in capacitance. Lines of the touch electrodes 30 are arranged in the X-axis direction and the Y-axis direction at intervals to form the matrix in the display area AA. Each of the touch electrodes 30 has a rectangular shape in a plan view. A length of each side is some millimeters (e.g., from 2 mm to 5 mm). The touch electrodes 30 are significantly larger than pixels PX, which will be described later, when viewed in plan. Each of the touch electrodes 30 straddles multiple pixels PX (e.g., dozens of the pixels PX) in the X-axis direction and the Y-axis direction.

As illustrated in FIG. 1, the touch lines 31 (the position detecting lines) are selectively connected to the touch electrodes 30 provided in the liquid crystal panel 11. The touch lines 31 extend in the Y-axis direction to cross the touch electrodes 30 arranged in the Y-axis direction. The touch lines 31 are selectively connected to the specific touch electrodes 30. The touch lines 31 are independently connected to the touch electrodes 30. The number of the touch lines 31 overlapping one touch electrode 30 is equal to the number of the touch electrodes 30 in the Y-axis direction. The number of the touch lines 31 overlapping one touch electrode 30 is smaller than the number of the source lines 27 overlapping one touch electrode 30. In FIG. 1, sections of the touch lines 31 connected to the touch electrodes 30 (touch line contact holes CH2, which will be described later) are indicated by black dots. The touch lines 31 are connected to the detecting circuit. In FIG. 1, the arrangement of the touch electrodes 30 is schematically illustrated. The number, the arrangement, and the two-dimensional shape of the touch electrodes 30 may be altered from those illustrated in FIG. 1 where appropriate.

As illustrated in FIG. 1, a switch circuit 15, a common signal source 16, and a common signal switch circuit 17 are disposed on an opposite side from the CF substrate non-overlapping portion 21A (the driver 12) relative to the display area AA in the Y-axis direction in the non-display area NAA of the array substrate 21. The switch circuit 15 is connected to the source lines 27 and the touch lines 31. The common signal source 16 is configured to supply common signals. The common signal switch circuit 17 is connected to the touch lines 31 and the common signal source 16. The switch circuit 15, the common signal source 16, and the common signal switch circuit 17 are disposed in an area such that the display area AA is sandwiched between the area and the driver 12 in the Y-axis direction. According to the arrangement, a width of a section of the non-display area NAA of the array substrate 21 on a driver 12 side relative to the display area AA in the Y-axis direction is maintained smaller. The switch circuit 15, the common signal source 16, and the common signal switch circuit 17 will be described in detail later.

Figure 2:
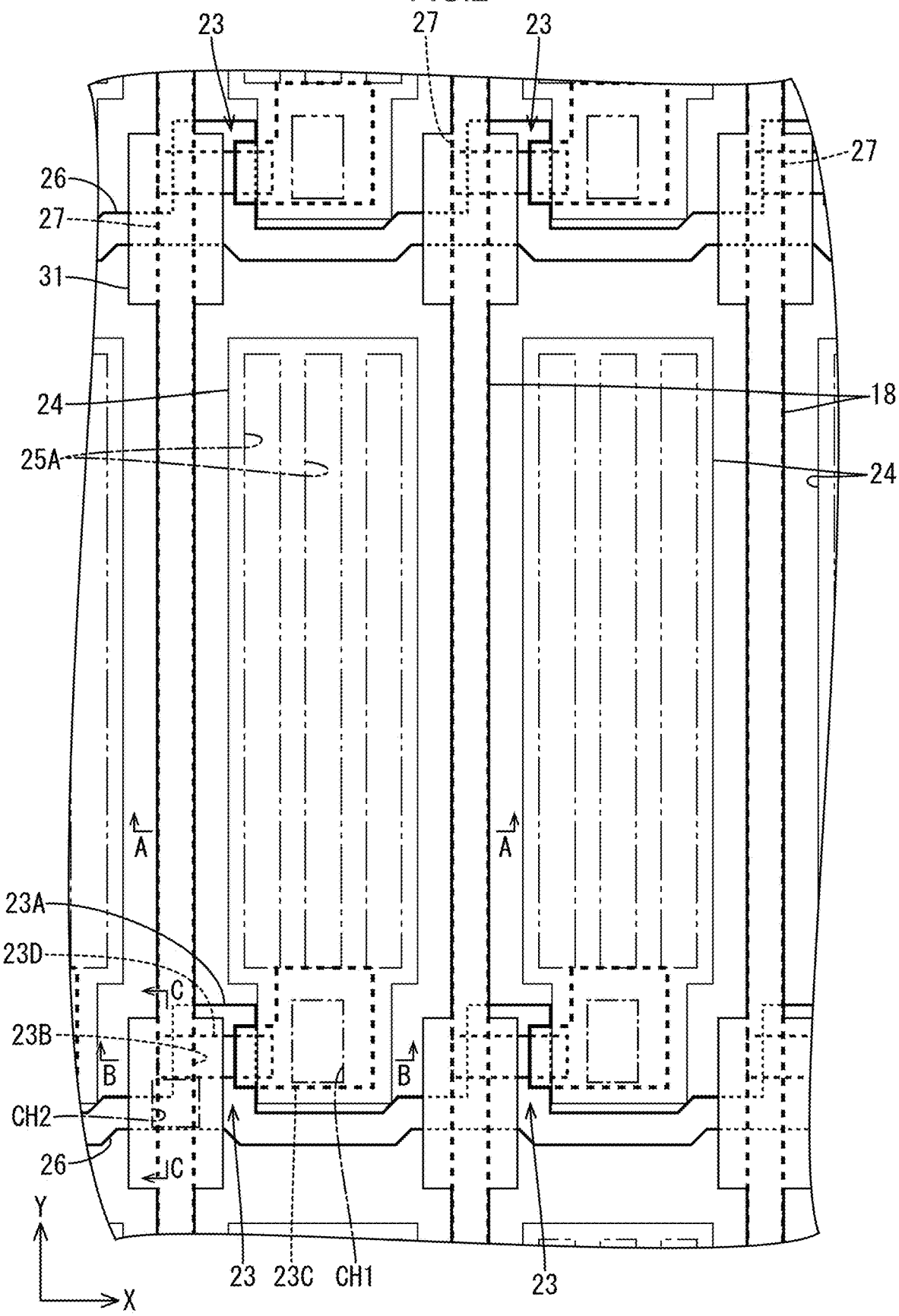
FIG. 2 is a plan view of the liquid crystal panel illustrating an arrangement of pixels.

FIG. 2 is a plan view of a section of the array substrate 21 included in the liquid crystal panel 11 in the display area AA. As illustrated in FIG. 2, thin film transistors (TFTs) 23 (switching components) and pixel electrodes 24 are disposed on the inner surface of the array substrate 21 in the display area AA. Lines of the TFTs 23 and lines of the pixel electrodes 24 are arranged at intervals in the X-axis direction and the Y-axis direction to form a matrix. Around the TFTs 23 and the pixel electrodes 24, the gate lines 26 (scanning lines) and the source lines 27 (image lines, data lines) are routed substantially perpendicular to (to cross) each other. The gate lines 26 extend substantially in the X-axis direction. Ends of the gate lines 26 are drawn to the non-display area NAA and connected to the corresponding gate circuits 14 (see FIG. 1). The source lines 27 extend substantially in the Y-axis direction. Ends of the source lines 27 on one side are drawn to the non-display area NAA and connected to the driver 12 (see FIG. 1). The gate lines 26 are connected to gate electrodes 23A of the TFTs 23. The source lines 27 are connected to source electrodes 23B of the TFTs 23. The pixel electrodes 24 are connected to drain electrodes 23C of the TFTs 23. When the TFTs 23 turn on based on the scanning signals supplied through the gate lines 26, the TFTs 23 supply the image signals that will be transmitted to the source lines 27 from the source electrodes 23B to the drain electrodes 23C via channels 23D (semiconductor portions). The pixel electrodes 24 are charged to potentials based on the image signals. Each of the pixel electrodes 24 has a vertically-long rectangular in a plan view. A short dimension and a long dimension of each of the pixel electrodes 24 extend in a direction in which the gate lines 26 extend and in a direction in which the source lines 27 extend, respectively.

Configurations of the TFTs 23 and the pixel electrodes 24 will be described in detail. As illustrated in FIG. 2, the TFTs 23 include the gate electrodes 23A that branch out from the gate lines 26. The gate electrodes 23A project from the gate lines 26 in the Y-axis direction toward the upper side in FIG. 2. Each of the gate electrodes 23A has a rectangular shape. The TFTs 23 include the source electrodes 23B that include sections of the source lines 27 (sections overlapping the gate electrodes 23A). The source electrodes 23B are locates at ends of the TFTs 23 on one side in the X-axis direction. About entire areas of the source electrodes 23B overlap the gate electrodes 23A. The source electrodes 23B are connected to the channels 23D. The TFTs 23 include the drain electrodes 23C disposed away from the source electrodes 23B in the X-axis direction. The drain electrodes 23C extend substantially in the X-axis direction. The drain electrodes 23C include first ends and second ends. The first ends are opposed to the source electrodes 23B and overlap the gate electrodes 23A. The first ends are connected to the channels 23D. The second ends are connected to the pixel electrodes 24. The TFTs 23 include the channels 23D that are made of a semiconductor material. Each of the channels 23D has a horizontally-long rectangular extending in the X-axis direction. The channels 23D include first ends connected to the source electrodes 23B and second ends connected to the drain electrodes 23C. Each of the pixel electrodes 24 has a rectangular shape. The pixel electrodes 24 overlap corresponding pixel holes 29A in a black matrix 29. Edges of the pixel electrodes 24 on the lower side in the Y-axis direction in FIG. 2 overlap the drain electrodes 23C and are connected to the drain electrodes 23C.

Figure 3:
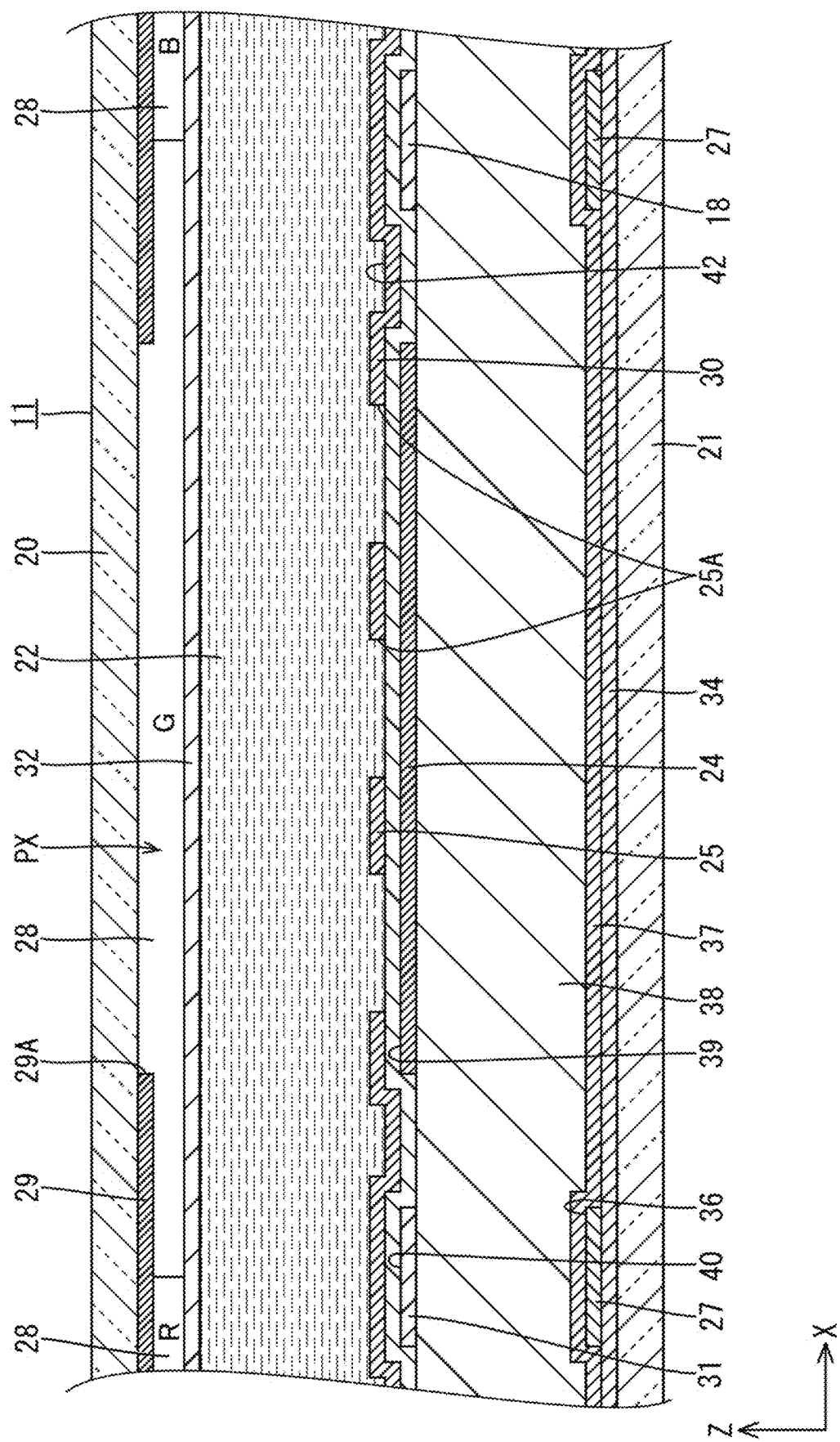
FIG. 3 is a cross-sectional view of the liquid crystal panel along line A-A in FIG. 2.

FIG. 3 is a cross-sectional view of a section of the liquid crystal panel 11 including the middle section of the pixel PX. As illustrated in FIG. 3, the liquid crystal panel 11 includes a liquid crystal layer 22 (a medium layer) disposed between the substrates 20 and 21. The liquid crystal layer 22 includes liquid crystal molecules. The liquid crystal molecules are substances having an optical characteristic that varies according to application of an electric field. This embodiment includes spacers disposed between the substrates 20 and 21 for maintaining a gap between the substrates 20 and 21. Three colors of color filters 28 that exhibit blue (B), green (G), and red (R) are disposed on an inner surface side of the CF substrate 20 of the liquid crystal panel 11 in the display area AA. The different colors of the color filters 28 are repeatedly arranged in lines along the gate lines 26 (the X-axis direction). The lines of the color filters 28 extend along the source lines 27 (substantially in the Y-axis direction) to form stipes. The color filters 28 are disposed to overlap the pixel electrodes 24 on the array substrate 21 in a plan view. Borders between the color filters 28 that are adjacent to each other in the X-axis direction and exhibit to the different colors overlap the source lines 27 (including touch lines 31). In the liquid crystal panel 11, each R color filter 28, each G color filter 28, and the pixel electrode 24 that are arranged in the X-axis direction and the pixel electrodes 24 that are opposed to the R, the G, and the B color filters 28 form three colors of the pixels PX. In the liquid crystal panel 11, the R, the G, and the B pixels PX arranged in the X-axis direction form display pixels for color display in predefined tones. The black matrix 29 (an inter-pixel light blocking portion) is disposed on the CF substrate 20. The black matrix 29 is formed in a grid pattern in the plan view to separate the adjacent color filters 28 (the pixel electrodes 24). The black matrix 29 includes pixel holes 29A at positions overlapping large areas of the pixel electrodes 24 on the array substrate 21 in the plan view. Light passed through the pixel electrodes 24 is output to the outside of the liquid crystal panel 11 through the pixel holes 29A. The black matrix 29 is disposed to overlap at least the gate lines 26 and the source lines 27 (including the touch lines 31) on the array substrate in the plan view. An OC film 32 is formed in a solid pattern in a layer upper than the color filters 28 (on the liquid crystal layer 22 side) for an about entire area of the CF substrate 20. Alignment films are formed on the inner-most surfaces of the substrates 20 and 21 contacting the liquid crystal layer 22 for orienting the liquid crystal molecules includes in the liquid crystal layer 22.

Next, a common electrode 25 will be described. As illustrated in FIGS. 2 and 3, the common electrode 25 is disposed in a layer upper than the pixel electrodes 24 on an inner surface side of the array substrate 21 in the display area AA to overlap all of the pixel electrodes 24. A constant reference voltage is normally supplied to the common electrode 25 except for periods for detecting positions of inputs by the finger, which is the position inputting member, (sensing periods) after the touch signals (the position detecting signals) are supplied. The common electrode 25 extends for the about entire display area AA. Sections of the common electrode overlapping the pixel electrodes 24 include pixel overlapping voids 25A (pixel overlapping slits, orientation control slits). The pixel overlapping voids 25A extend in the longitudinal direction of the pixel electrodes 24. The number, the shape, and forming areas of the pixel overlapping voids 25A may be altered from those illustrated in the drawings where appropriate. When the pixel electrodes 24 are charged and differences are created between the pixel electrodes 24 and the common electrode 25 that overlap each other, fringe electric fields (oblique electric fields) are generated between edges of the pixel overlapping voids 25A and the pixel electrodes 24. Each fringe electric field includes a component along the plate surface of the array substrate 21 and a component in a normal direction to the plate surface of the array substrate 21. Using the fringe electric fields, the orientation of the liquid crystal molecules in the liquid crystal layer 22 can be controlled. The liquid crystal panel 11 in this embodiment is configured to operate in fringe field switching (FFS) mode. The common electrode 25 includes the touch electrodes 30. The common electrode 25 includes partition voids 25B (partition slits) for partitioning the adjacent touch electrodes 30 (see FIG. 1) in addition to the pixel overlapping voids 25A. The partition voids 25B include horizontal portions and vertical portions to form a grid as a whole in the plan view. The horizontal portions extend horizontally across the common electrode 25 for an entire dimension in the X-axis direction. The vertical portions extend vertically across the common electrode 25 for an entire dimension in the Y-axis direction. The common electrode 25 includes the touch electrodes 30 that are partitioned by the partition voids 25B and arranged in a grid in the plan view. The touch electrodes 30 are electrically isolated from each other. The common signals (the reference voltage signals) related to the display function and the touch signals related to the touch function are transmitted to the touch electrodes 30 through the touch lines 31 at different timings (with time division). The common signals are transmitted to all of the touch lines 31 at the same timing and thus all of the touch lines 31 are held at the reference potential and function as the common electrode 25. The touch lines 31 are disposed to overlap the source lines 27 in the plan view. A width of each touch line 31 is about equal to a width of each source line 27 for the most part but a width of the touch line is larger than the width of the source line 27 for some parts (portions overlapping the gate lines 26).

Figure 4:
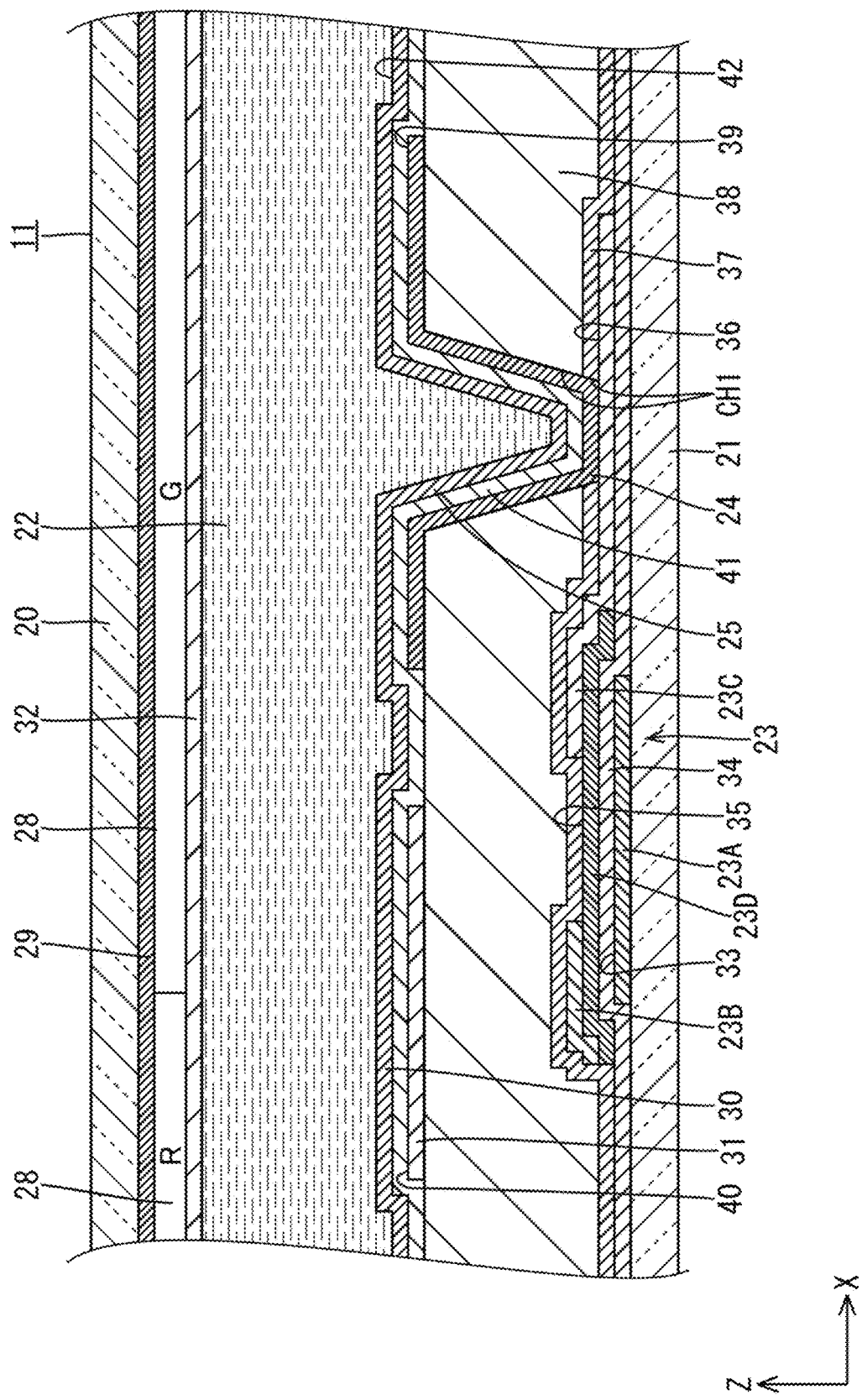
FIG. 4 is a cross-sectional view of the liquid crystal panel along line B-B in FIG. 2.

Various films stacked in layers on the inner surface side of the array substrate 21 will be described with reference to FIG. 4. FIG. 4 is a cross-sectional view of a section of the liquid crystal panel including the TFT 23. As illustrated in FIG. 4, on the array substrate 21, a first metal film 33, a gate insulator 34, a semiconductor film 35, a second metal film 36, a first interlayer insulator 37, a planarization film 38, a first transparent electrode film 39, a third metal film 40, a second interlayer insulator 41, and a second transparent electrode film 42 are stacked in layers in this sequence from a lower layer side on the array substrate 21. Each of the first metal film 33, the second metal film 36, and the third metal film 40 may be a single-layer film made of one kind of metal selected from copper, titanium, aluminum, molybdenum, and tungsten, a multi-layer film made of different kinds of metals, or an alloy to have conductivity and a light blocking property. The gate lines 26 and the gate electrodes 23A of the TFTs 23 may be prepared from the first metal film 33. The source lines 27 and the source electrodes 23B and the drain electrodes 23C of the TFTs 23 may be prepared from the second metal film 36. The touch lines 31 may be prepared from the third metal film 40. The semiconductor film 35 may be a thin film made of a semiconductor material such as an oxide semiconductor material and an amorphous silicon material. The channels 23D of the TFTs 23 may be prepared from the semiconductor film 35. If the semiconductor film 35 is made of the oxide semiconductor material, the mobility in the channels 23D increases. Therefore, this configuration is preferable for reducing the TFTs 23 in size. The first transparent electrode film 39 and the second transparent electrode film 42 may be made of a transparent electrode material (e.g., indium tin oxide (ITO)) or indium zinc oxide (IZO). The pixel electrodes 24 may be prepared from the first transparent electrode film 39. The first transparent electrode film 39 and the third metal film 40 are disposed in the same layer upper than the first interlayer insulator 37. The common electrode 25 (the touch electrodes 30) is prepared from the second transparent electrode film 42. The touch lines 31 are prepared from the third metal film 40, that is, have the single-layer structure in this embodiment. However, the touch lines 31 may be prepared from the first transparent electrode film 39 and the third metal film 40, that is, have a multi-layer structure.

Figure 5:
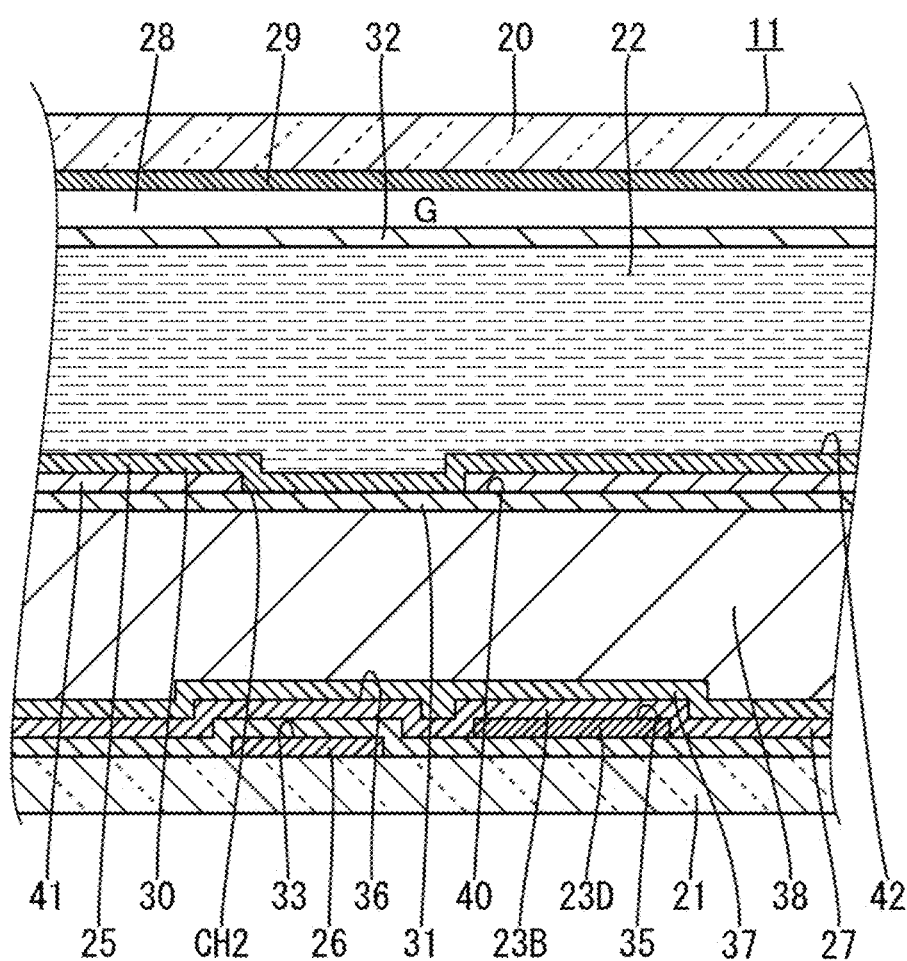
FIG. 5 is a cross-sectional view of the liquid crystal panel along line C-C in FIG. 2.

As illustrated in FIG. 4, the gate insulator 34, the first interlayer insulator 37, and the second interlayer insulator 41 are made of inorganic materials such as silicon nitride ($SiN_x$) and silicon oxide ($SiO_2$). The planarization film is made of an organic insulating material (an organic material) such as PMMA (an acrylic resin material). The thickness of the planarization film 38 is larger than the thicknesses of other insulators 34, 37, and 41 made of the inorganic materials. With the planarization film 38, a surface of the array substrate 21 is planarized. The gate insulator 34 insulates the first metal film 33 in the lower layer from the semiconductor film 35 and the second metal film 36 in the upper layers. Therefore, sections of the gate lines 26 prepared from the first metal film 33 and sections of the source lines 27 prepared from the second metal film 36 overlapping each other are electrically isolated from each other by the gate insulator 34. The first interlayer insulator 37 and the planarization film 38 insulate the semiconductor film 35 and the second metal film 36 in the lower layers from the first transparent electrode film 39 and the third metal film 40 in the upper layer. The first interlayer insulator 37 and the planarization film 38 are disposed between the source lines 27 prepared from the second metal film 36 and the touch lines 31 prepared from the third metal film 40. Although the source lines 27 and the touch lines 31 overlap each other, the source lines 27 and the touch lines 31 are electrically isolated from each other. Sections of the first interlayer insulator 37 and the planarization film 38 overlapping both the drain electrodes 23C of the TFTs 23 and the pixel electrodes 24 include pixel electrode contact holes CH1 for connecting the drain electrodes 23C to the pixel electrodes 24. The second interlayer insulator 41 insulates the first transparent electrode film 39 and the third metal film 40 in the lower layer from the second transparent electrode film 42 in the upper layer. Sections of the second interlayer insulator 41 overlapping both the touch lines 31 and the touch electrodes 30 to which the touch lines are connected include touch line contact holes CH2 for connecting the touch lines 31 to the touch electrodes 30 as illustrated in FIG. 5. FIG. 5 is a cross-sectional view of a section of the liquid crystal panel 11 including the touch line contact hole CH2.

Figure 6:
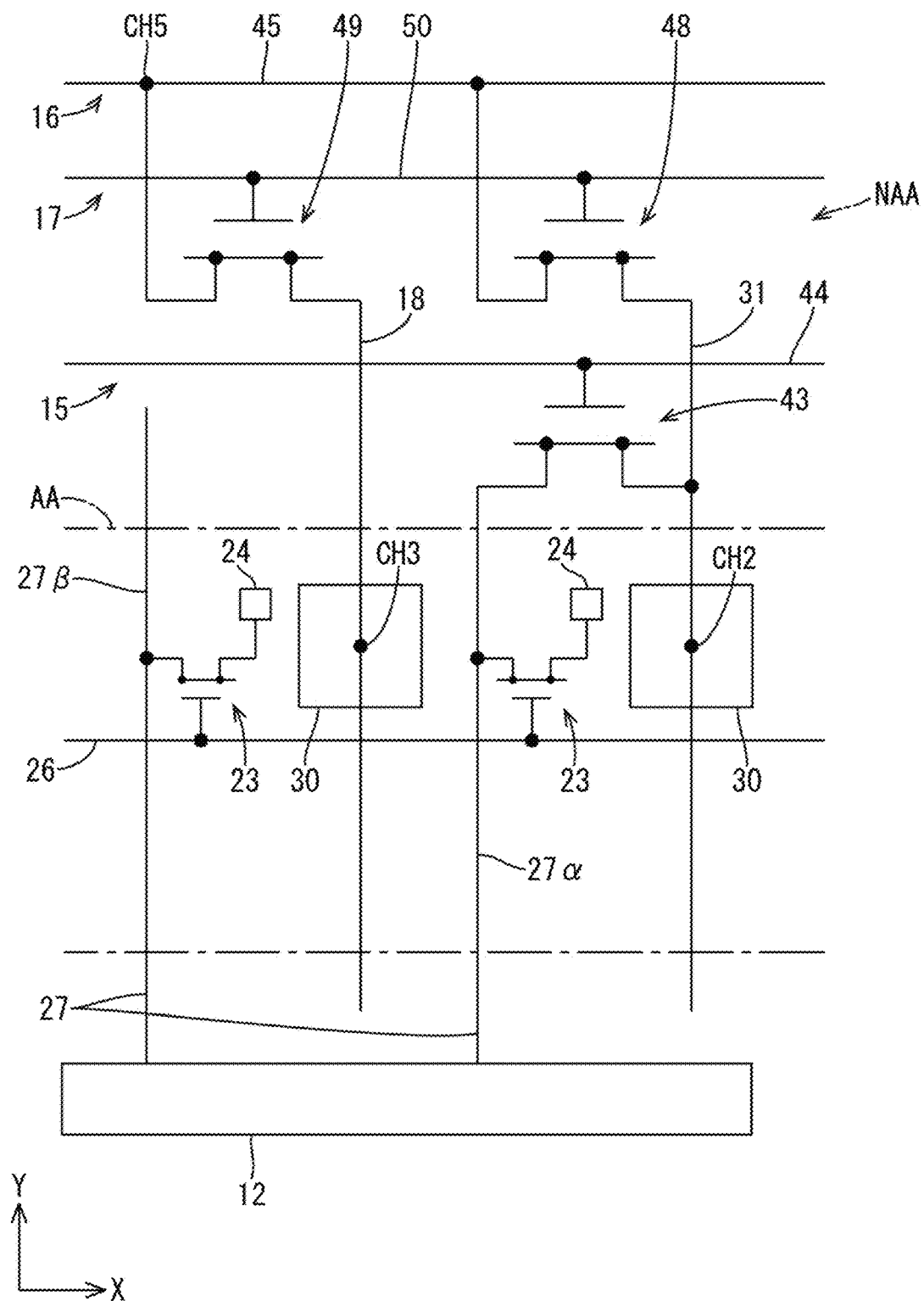
FIG. 6 is a circuit diagram illustrating an electrical configuration of an array substrate included in the liquid crystal panel.

Next, the switch circuit 15, the common signal source 16, and the common signal switch circuit 17 will be described. FIG. 6 is a circuit diagram schematically illustrating an electric configuration of the array substrate 21. As illustrated in FIG. 6, the switch circuit 15 is connected to ends of the source lines 27 and the touch lines 31 on an opposite side from the driver 12 in the Y-axis direction. The switch circuit 15 is configured to control electric currents through the source lines 27 and the touch lines 31 between flow and stop at predefined timings. The source lines 27 and the touch lines 31 connected to the switch circuit 15 are disposed to overlap each other. Then number of the touch lines 31 is smaller than the number of the source lines 27. The source lines 27 include first source lines 27α that overlap the touch lines 31 and second source lines 27β that does not overlap the touch lines 31. The source lines 27 that overlap the touch lines 31 are defined as the first source lines and indicated by reference sign 27α. The source lines 27 that do not overlap the touch lines 31 are defined as the second source lines and indicated by reference sign 27β. The reference sign without the suffixes will be used in descriptions of common structures and functions. The image signals and the touch signals are supplied to the first source lines 27α by the driver 12 with time-division. Only the image signals are supplied from the driver 12 to the second source lines 27β. Common lines 18 are disposed to overlap the second source lines 27β. The common lines 18 are prepared from the third metal film 40 from which the touch lines 31 are prepared. In the display area AA, the common lines 18 and the touch lines 31 have substantially the same configuration (see FIG. 2). The common lines 18 are connected to the touch electrodes 30 (the common electrode 25) via common line contact holes CH3 formed in the second interlayer insulator 41. The common lines 18 transmit the common signals and thus the touch electrodes 30 (the common electrode 25) are held at the reference voltage based on the common signals. The number of the common lines 18 is equal to the number of the source lines 27 minus the number of the touch lines 31. All the source lines 27 overlap the touch lines 31 or the common lines 18. Because load capacitances of the source lines 27 are equalized and the common lines 18 are provided in the maximum number, the common signals are less likely to be rounded. The number of the first source lines 27α is equal to the number of the touch lines 31. The number of the second source lines 27β is equal to the number of the common lines 18. The touch lines 31 and the common lines 18 are disposed to overlap the first source lines 27α and the second source lines 27β for entire lengths of the first source lines 27α and the second source lines 27β, respectively, in the display area AA. Therefore, the load capacitances of the first source lines 27α and the second source lines 27β are equalized. The common signal source 16 is configured to supply the common signals. The common signal switch circuit 17 is connected to the ends of the common lines 18 and the touch lines 31 on the opposite side from the driver 12 in the Y-axis direction and to the common signal source 16. The common signal switch circuit 17 is configured to control start and stop of feedings of electric currents to the common lines 18 and the touch lines 31 at predefined timings.

Figure 7:
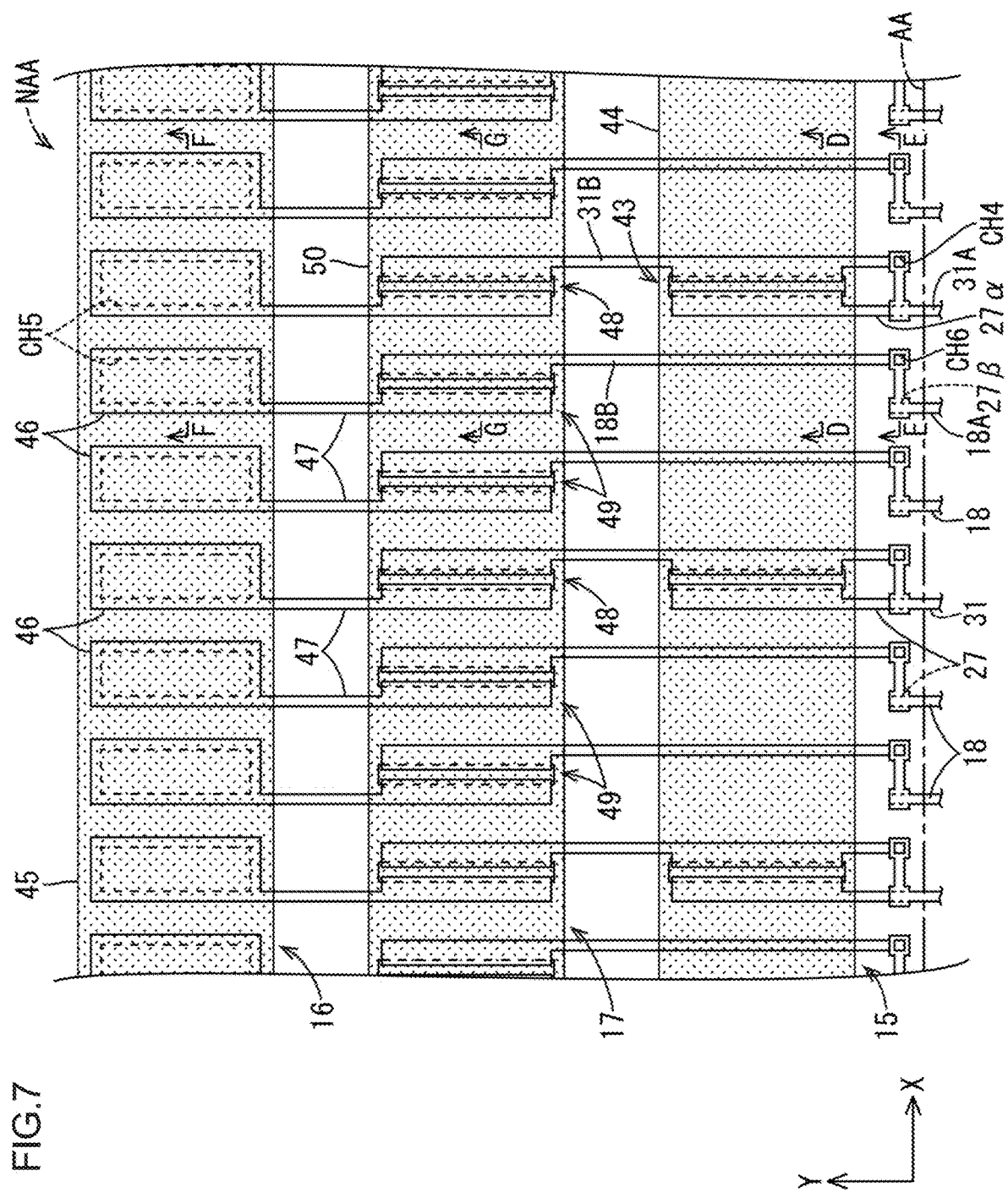
FIG. 7 is a plan view of a section of the array substrate including a switch circuit, a common signal source, and a common signal switch circuit.

FIG. 7 is a plan view of the array substrate 21 including the switch circuit 15, the common signal source 16, and the common signal switch circuit 17. In FIG. 7, an area in which the first metal film 33 is formed is indicated by hatching. As illustrated in FIG. 7, the switch circuit 15 is disposed adjacent to the display area AA. The switch circuit 15 is located closer to the display area AA relative to the common signal source 16 and the common signal switch circuit 17. According to the configuration, electrical connection of the source lines 27 and the touch lines 31 is controlled by the switch circuit 15 but the source lines 27 and the touch lines 31 do not cross the common signal source 16 and the common signal switch circuit 17. Therefore, the load capacitances of the source lines 27 and the touch lines 31 are reduced and the signals (the touch signals) transmitted by the source lines 27 and the touch lines 31 are less likely to be rounded. Furthermore, the common signal switch circuit 17 is located closer to the display area AA relative to the common signal source 16. In comparison to a configuration in which the common signal source is located closer to the display area AA relative to the common signal switch circuit 17, lengths of sections of the common lines 18 and the touch lines 31 connected with the common signal switch circuit can be shortened. According to the configuration, the signals (the common signals) transmitted by the common lines 18 and the touch lines 31 are less likely to be rounded.

The switch circuit 15 will be described in detail. As illustrated in FIG. 7, the switch circuit 15 includes switching TFTs 43 and a switching line 44. The switching TFTs 43 are connected to the source lines 27 and the touch lines 31 that overlap each other. The switching line 44 is for controlling driving of the switching TFTs 43. The switching line 44 has a band shape and linearly extends in the X-axis direction. The switching line 44 is connected to the driver 12, the flexible substrate 13, or the gate circuits 14 via a connecting line for receiving signals to control turn-on and turn-off of the switch circuit 15. The switching TFTs 43 are disposed at intervals in a direction in which the switching line 44 extends to overlap the switching line 44. The number of the switching TFTs 43 is equal to the number of the touch lines 31. The switching TFTs 43 are collectively driven at timing at which the signals are supplied to the switching line 44 for turning on the switch circuit 15. The switch circuit 15 starts current feedings to the source lines 27 and the touch lines 31 in synchronization with feedings of the touch signals from the driver 12 to the source lines 27.

Figure 8:
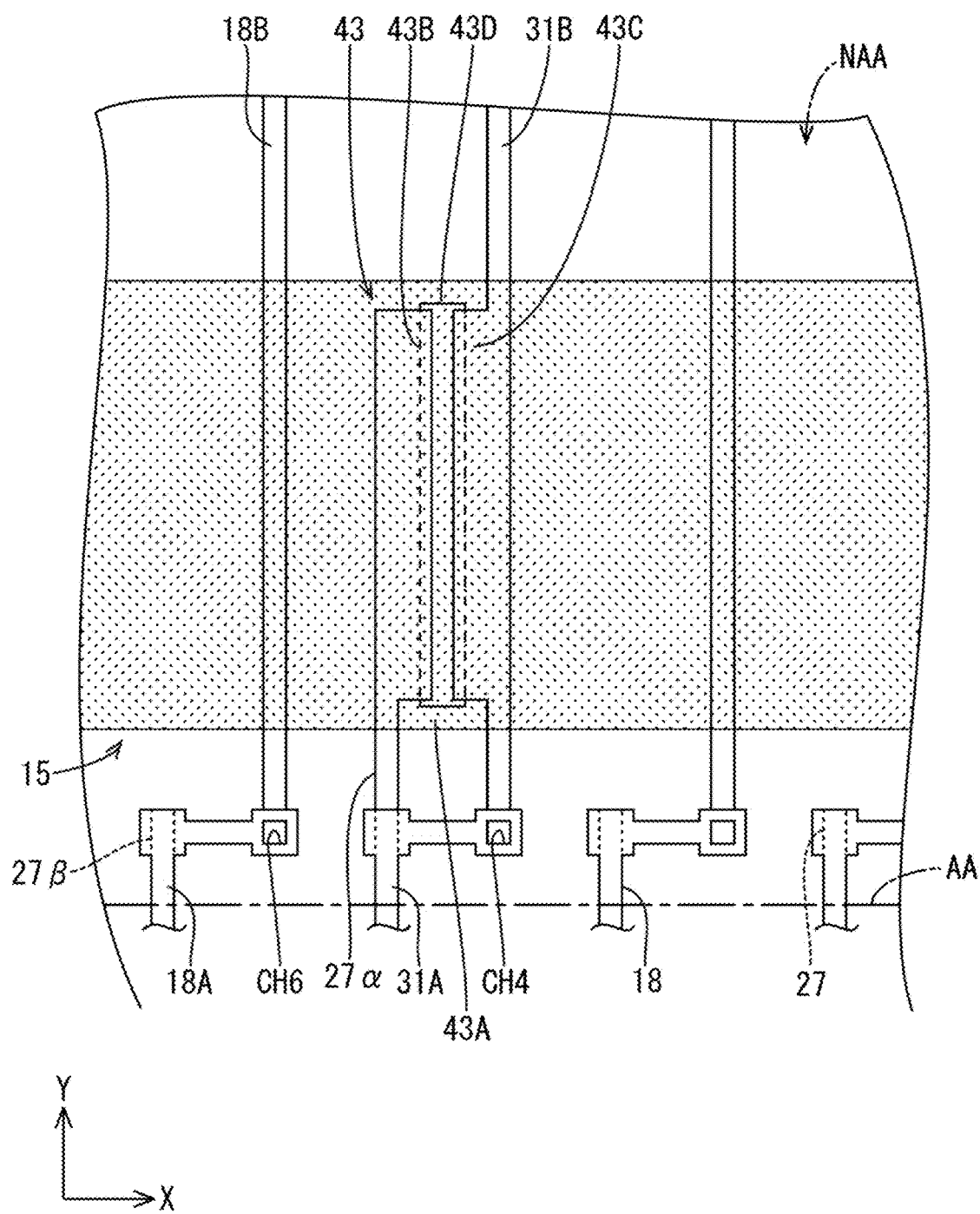
FIG. 8 is a plan view of a section of the array substrate including the switch circuit.
Figure 9:
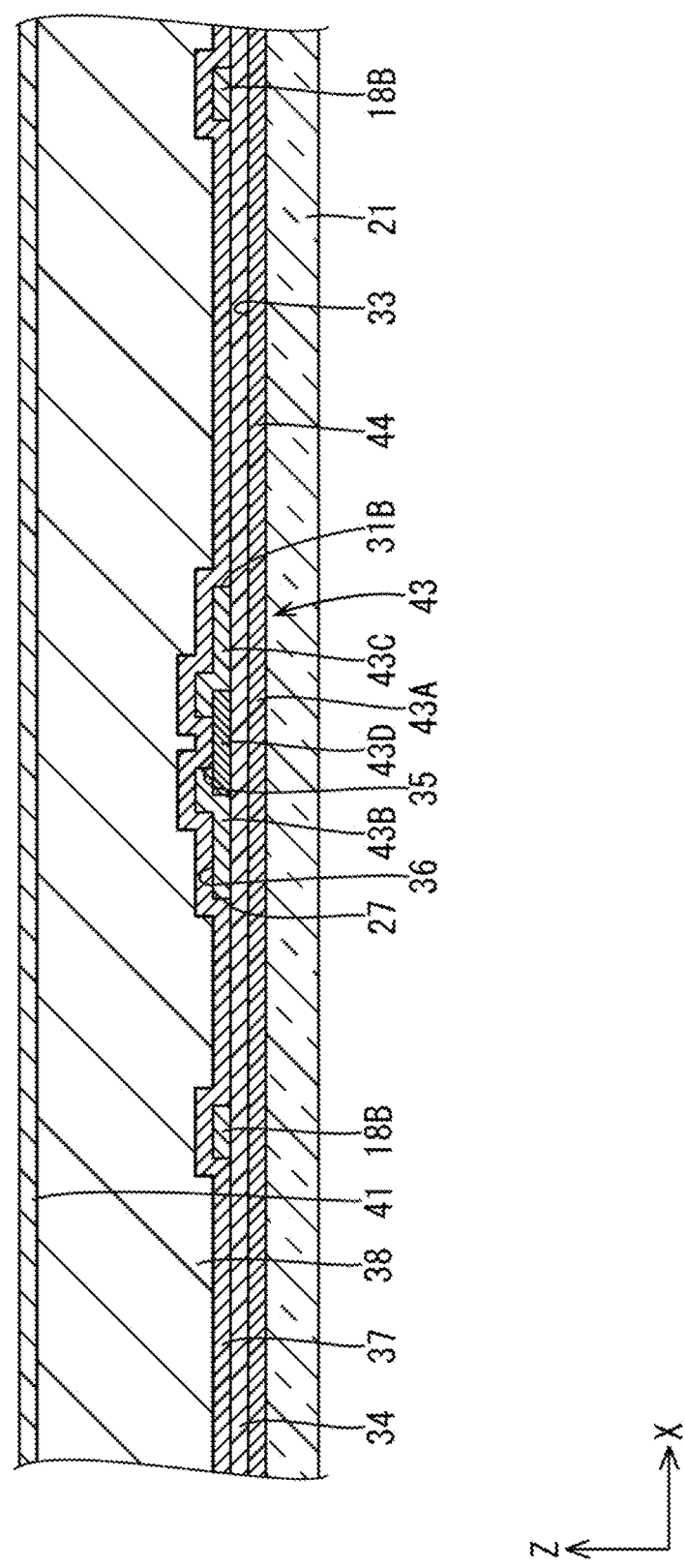
FIG. 9 is a cross-sectional view of the array substrate along line D-D in FIG. 7.
Figure 10:
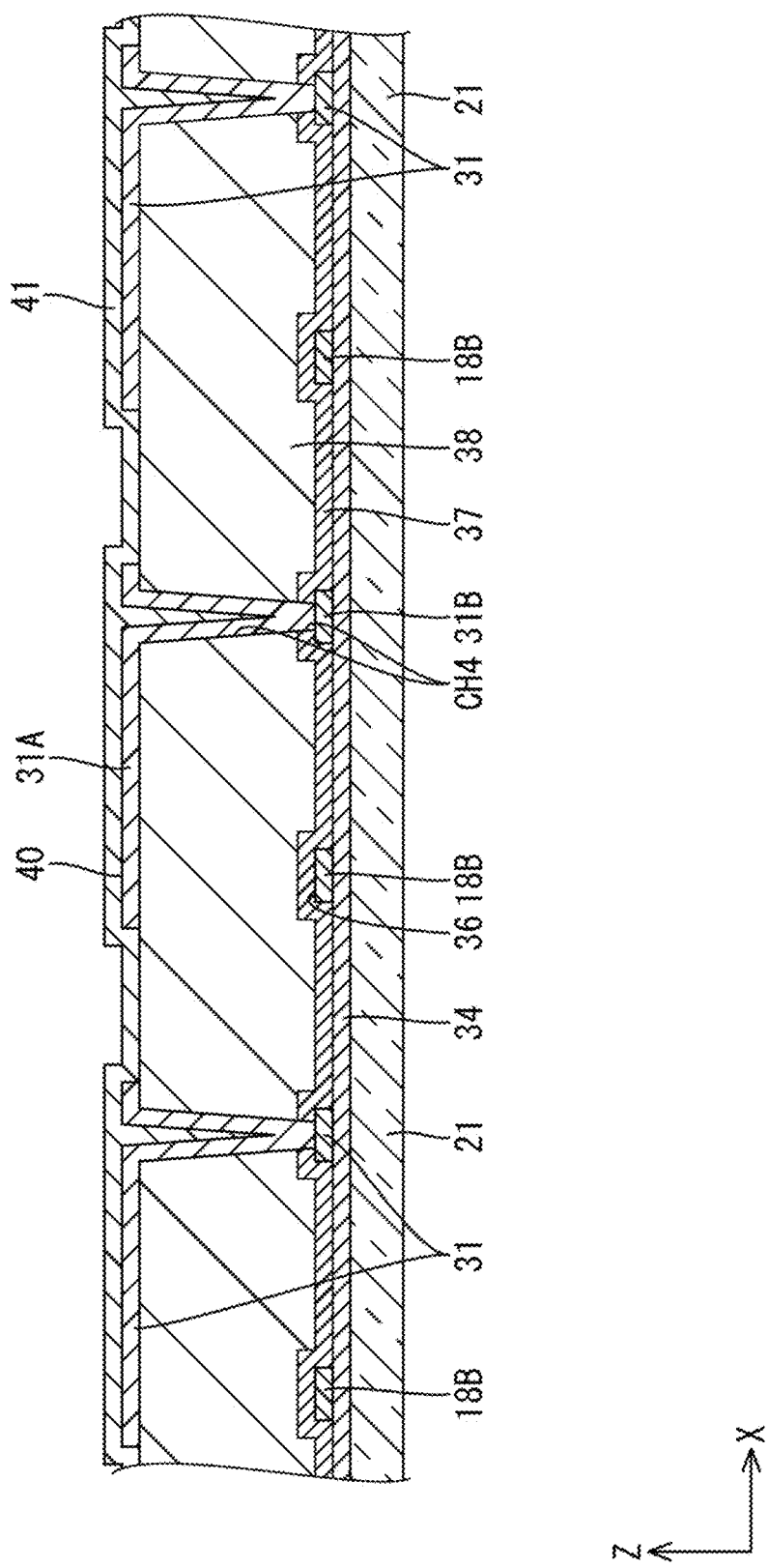
FIG. 10 is a cross-sectional view of the array substrate along line E-E in FIG. 7.

FIG. 8 is a plan view of a section of the array substrate 21 including the switch circuit 15. In FIG. 8, an area in which the first metal film 33 is formed is indicated by hatching. FIG. 9 is a cross-sectional view of the array substrate 21 cut at the switching TFT 43. FIG. 10 is a cross-sectional view of a section of the array substrate 21 including the source line 27 and the touch lines 31 to which the switching TFT 43 is connected. As illustrated in FIGS. 8 and 9, the switching TFT 43 includes a gate electrode 43A, a source electrode 43B, a drain electrode 43C, and a channel 43D. The gate electrode 43A includes a section of the switching line 44. The source electrode 43B includes an end of the source line 27. The drain electrode 43C includes an end of the touch line 31. The drain electrode 43C is separated from the source electrode 43B in the X-axis direction by a gap. The channel 43D includes a first end connected to the source electrode 43B and a second end connected to the drain electrode 43C in the X-axis direction. The gate electrode 43A and the switching line 44 are prepared from the first metal film 33. The channel 43D is prepared from the semiconductor film 35. If an oxide semiconductor is used for a semiconductor material of the semiconductor film 35, the mobility in the channel 43D improves. It is preferable for reducing a size of the switching TFT 43. The source electrode 43B and the drain electrode 43C are prepared from the second metal film 36. As illustrated in FIGS. 8 and 10, the touch line 31 is disposed in the display area AA. The touch line 31 includes a body portion 31A and a connecting portion 31B. The body portion 31A includes an end drawn to the non-display area NAA. The body portion 31A is prepared from the third metal film 40. The connecting portion 31B (including the drain electrode 43C) connected to the switching TFT 43 is prepared from the second metal film 36. The body portion 31A of the touch line 31 includes an end section that is bent such that the end section does not overlap the source line 27 to which the touch line 31 is connected. An end of the end section is disposed to overlap the connecting portion 31B. Section of the body portion 31A and the connecting portion 31B of the touch line 31 overlapping each other are connected to each other via connecting portion contact holes CH4 drilled through the first interlayer insulator 37 and the planarization film 38. The entire source line 27 connected to the switching TFT 43 is prepared from the second metal film 36. The end of the source line 27 drawn to the non-display area NAA overlaps the switching line 44 and includes the source electrode 43B.

According to the configuration, when the signal is supplied to the switching line 44 to turn on the switch circuit 15, the gate electrode 43A of the switching TFT 43 is charged to a potential based on the signal and the switching TFT 43 turns on. The source electrode 43B and the drain electrodes are electrically connected via the channel 43D and thus the source line 27 and the touch line 31 are electrically connected. The image signal and the touch signal are supplied to the source line 27 overlapping the touch line 31 by the driver 12 with time-division. Therefore, a signal is supplied to the switching line 44 to turn on the switch circuit 15 in synchronization with feeding of the touch signal to the source line 27 by the driver 12 and the switching TFT 43 turns on. According to the configuration, the touch single output by the driver and input to a first end of the source line 27 is transmitted to the touch line 31 via the source line 27, a second end of the source line 27, and the switching TFT 43. With the source line 27 used for transmission of the touch signal in addition to transmission of the image signal, the switch circuit 15 can be disposed on an opposite side from the driver 12 relative to the display area AA. In comparison to the conventional configuration in which the switch circuit is disposed between the selector and the display circuit, the width of the frame on the driver 12 side relative to the display area AA can be reduced because the switch circuit 15 does not exist between the driver 12 and the display area AA.

Figure 11:
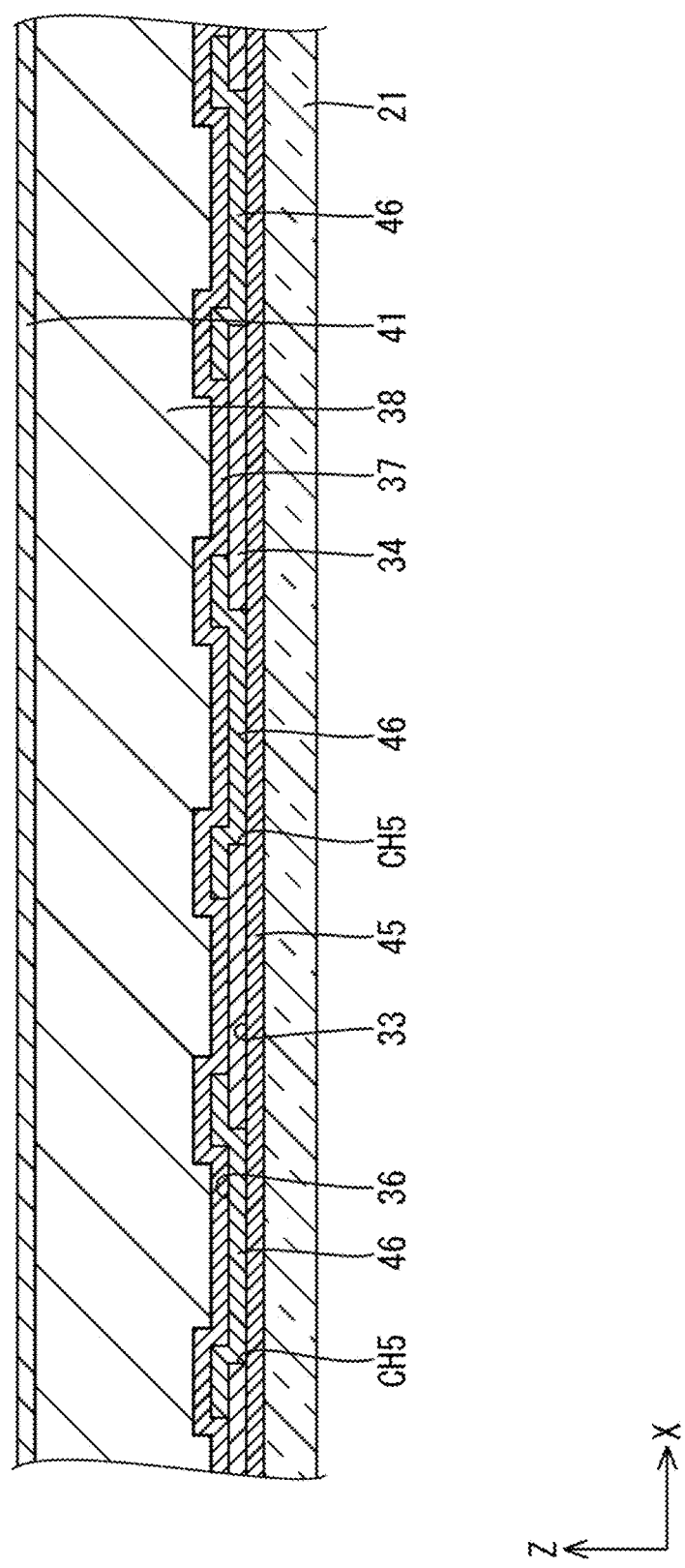
FIG. 11 is a cross-sectional view of the array substrate along line F-F in FIG. 7.

Next, the common signal source 16 and the common signal switch circuit 17 will be described in detail with reference to at least FIG. 7. As illustrated in FIG. 7, the common signal source 16 includes a common main line 45 and connecting electrodes 46. The common signals are transmitted through the common main line 45. The connecting electrodes 46 are connected to the common main line 45. The common main line 45 has a band shape linearly extending in the X-axis direction. The common main line 45 is connected to the driver 12, the flexible substrate 13, or the gate circuits 14 via the connecting lines to receive the common signals. The connecting electrodes 46 are arranged at intervals in a direction in which the common main line 45 extends to overlap the common main line 45. The number of the connecting electrodes 46 is equal to a total number of the common lines 18 and the touch lines 31 (the number of the source lines 27). FIG. 11 is a cross-sectional view of a section of the array substrate 21 including the common signal source 16. As illustrated in FIG. 11, the common main line 45 is prepared from the first metal film 33 and the connecting electrodes 46 are prepared from the second metal film 36. Sections of the common main line 45 and the connecting electrodes 46 overlapping each other are connected to each other via common main line contact holes CH5 formed in the gate insulator 34 disposed between the first metal film 33 and the second metal film 36. As illustrated in FIG. 7, first ends of connecting lines 47 are connected to the connecting electrodes 46. The connecting lines 47 are prepared from the second metal film 36 from which the connecting electrodes 46 are prepared. The connecting lines 47 extend in the Y-axis direction and second ends of the connecting lines 47 are connected to the common signal switch circuit 17, which will be described next.

As illustrated in FIG. 7, the common signal switch circuit 17 includes first common switching TFTs 48, second common switching TFTs 49, and a common switching line 50. The first common switching TFTs 48 are connected to the common signal source 16 and the touch lines 31. The second common switching TFTs 49 are connected to the common signal source 16 and the common lines 18. The common switching line 50 is for control of driving of the first common switching TFTs 48 and the second common switching TFTs 49. The common switching line 50 is connected to the driver 12, the flexible substrate 13, or the gate circuits 14 via the connecting lines for receiving signals to turn on or off the common signal switch circuit 17. The first common switching TFTs 48 and the second common switching TFTs 49 are arranged at intervals in the direction in which the common switching line 50 extends to overlap the common switching line 50. The number of the first common switching TFTs 48 and the number of the second common switching TFTs 49 are equal to the total number of the common lines 18 and the touch lines 31 (the number of the source lines 27). The first common switching TFTs 48 and the second common switching TFTs 49 are collectively driven at the timing at which the signal is supplied to the common switching line 50 to turn on the common signal switch circuit 17. The common signal switch circuit 17 electrically connects the common signal source 16 to the common lines 18 and the touch lines 31 in synchronization with the feeding of the image signals to the source lines 27 by the driver 12. The connecting portions 31B of the touch lines 31 are connected to the first common switching TFTs 48. The connecting portions 31B of the touch lines 31 are connected to the first common switching TFTs 48 and the switching TFTs 43 in the switch circuit 15. The common lines 18 connected to the second common switching TFTs 49 are routed to cross the switching lines 44 in the switch circuit 15 disposed on the display area AA side in the Y-axis direction relative to the common signal switch circuit 17 and to extend toward the display area AA.

Figure 12:
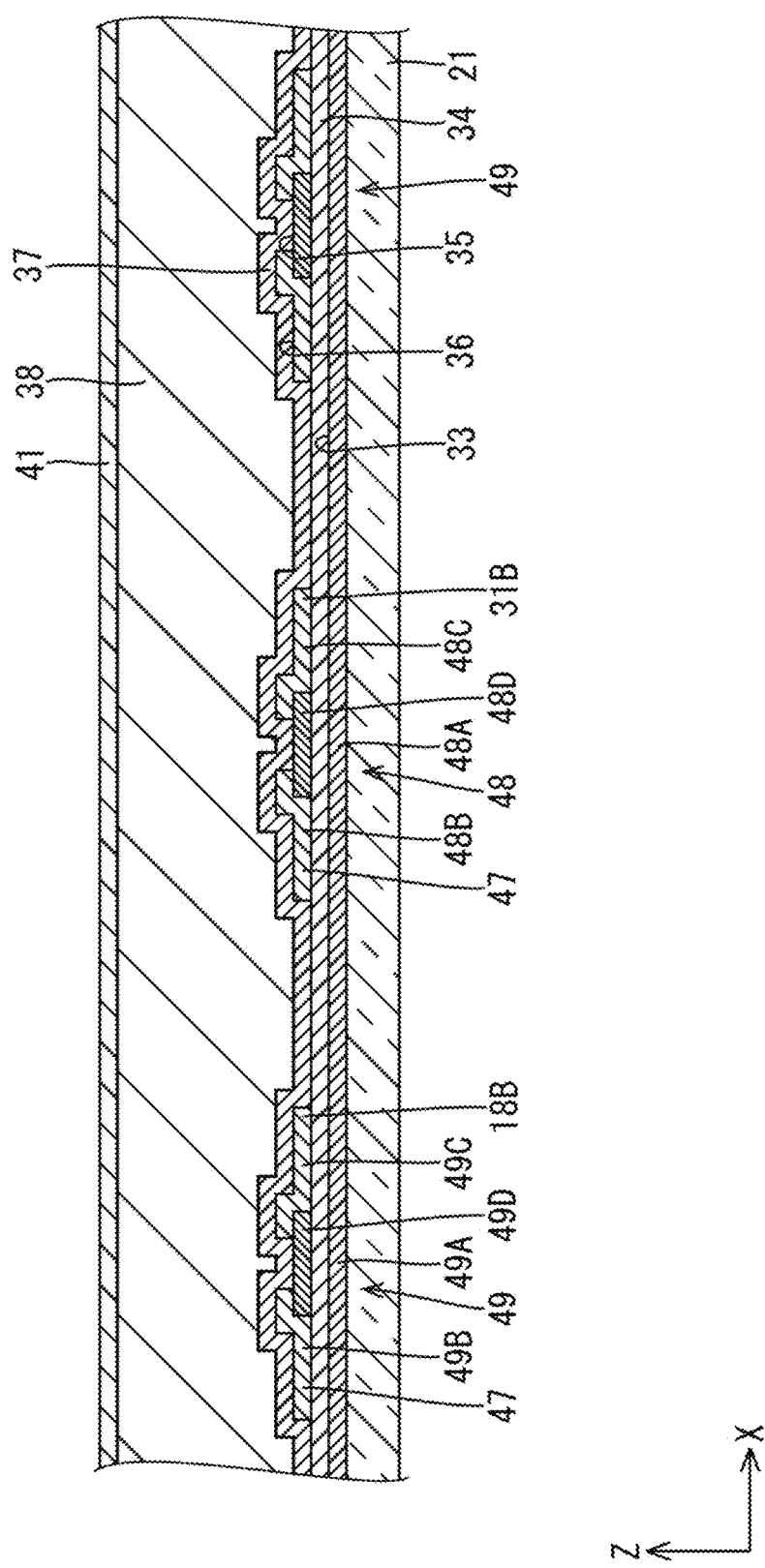
FIG. 12 is a cross-sectional view of the array substrate along line G-G in FIG. 7.

FIG. 12 is a cross-sectional view of the array substrate 21 cut at the first common switching TFTs 48 and the second common switching TFTs 49. As illustrated in FIGS. 7 and 12, the first common switching TFTs 48 include gate electrodes 48A, source electrodes 48B, drain electrodes 48C, and channels 48D. The second common switching TFTs 49 include gate electrodes 49A, source electrodes 49B, drain electrodes 49C, and channels 49D. The gate electrodes 48A and 49A include sections of the common switching line 50. The source electrodes 48B and 49B include ends of the connecting lines 47. The drain electrodes 48C are separated from the source electrodes 48B in the X-axis direction. The drain electrodes 49C are separated from the source electrodes 49B in the X-axis direction. First ends of the channels 48D and 49D in the X-axis direction are connected to the source electrodes 48B and 49B and second ends of the channels 48D and 49D in the X-axis direction are connected to the drain electrodes 43C. The drain electrodes 48C of the first common switching TFTs 48 include the connecting portions 31B of the touch lines 31. The drain electrodes 49C of the second common switching TFTs 49 include the ends of the common lines 18. The gate electrodes 48A and 49A and the common switching line 50 are prepared from the first metal film 33. The channels 48D and 49D are prepared from the semiconductor film 35. If the oxide semiconductor is used for the semiconductor material of the semiconductor film 35, the mobility in the channels 48D and 49D improves. This configuration is preferable for reducing the common switching TFTs 48 and 49 in size. The source electrodes 48B and 49B and the drain electrodes 48C and 49C are prepared from the second metal film 36. As illustrated in FIGS. 8 and 10, the common lines 18 are disposed in the display area AA similar to the touch lines 31. The common lines 18 include body portions 18A and connecting portions 18B. The body portions 18A include the ends drawn to the non-display area NAA. The ends are prepared from the third metal film 40. The connecting portions 18B (including the drain electrodes 49C) connected to the second common switching TFTs 49 are prepared from the second metal film 36. The body portions 18A of the common lines 18 includes the end sections that are bent so that the end sections do not overlap the source lines 27 to which the common lines 18 are connected and ends of the end sections are disposed to overlap the connecting portions 18B. The sections of the body portions 18A and the connecting portions 18B of the common lines 18 overlapping each other are connected to each other via connecting portion contact holes CH6 formed in the first interlayer insulator 37 and the planarization film 38 disposed between the second metal film 36 and the third metal film 40.

According to the configuration, when the signal is supplied to the common switching line 50 to turn on the common signal switch circuit 17, the gate electrodes 48A and 49A are charged to the potential based on the signal and the first common switching TFTs 48 and the second common switching TFTs 49 turn on. The source electrodes 48B and 49B are electrically connected to the drain electrodes 48C and 49C via the channels 48D and 49D. As a result, the common signal source 16 is electrically connected to the common lines 18 and the touch lines 31. The common signals supplied to the common lines 18 and the touch lines 31 by the common signal source 16 and thus the touch electrodes 30 in the display area AA are charged to the reference potential based on the common signal.

This embodiment has the configuration described above. Functions and operations of this embodiment will be described. The liquid crystal display device 10 according to this embodiment has the display function and the input position detecting function as described earlier. To exert the functions, the liquid crystal display device 10 is driven as follows. As illustrated in FIG. 6, the driver 12 in the liquid crystal panel 11 supplies the image signals to the source lines 27 to exert the display function during display periods and the touch signals to exert the input position detecting function during sensing periods with time-division. During the display periods, the image signals are supplied to the source lines 27 by the driver 12 and the scanning signals are supplied to the gate lines 26 by the gate circuits 14. With the signals, the TFTs 23 turn on and the pixel electrodes 24 are charged to the potentials based on the image signals. During the display periods, the signals are supplied to the switching lines 44 in the switch circuit 15 to turn off the switch circuit 15 in synchronization with the feedings of the image signals to the source lines 27 by the driver 12. Furthermore, the signals are supplied to the common switching line 50 in the common signal switch circuit 17 to turn on the common signal switch circuit 17. The switching TFTs 43 in the switch circuit 15 are not turned on and thus the image signals supplied to the source lines 27 are not transmitted to the touch lines 31. The common switching TFTs 48 and 49 in the common signal switch circuit 17 are turned on and thus the common signals supplied by the common signal source 16 are transmitted to the common lines 18 and the touch lines 31. The touch electrodes 30 connected to the common lines 18 and the touch lines 31 are charged to the reference potential based on the common signals to function as the common electrode 25. The orientation of the liquid crystal molecules in the liquid crystal layer 22 is controlled for every some pixels PX based on the potential differences between the pixel electrodes and the common electrode 25. As a result, specified images are displayed in the display area AA.

During the sensing periods, the touch signals are supplied to the first ends of the source lines 27 by the driver 12. In synchronization with that, the signals are supplied to the switching lines 44 in the switch circuit 15 to turn on the switch circuit 15. Furthermore, the signals are supplied to the common switching line 50 in the common signal switch circuit 17 to turn off the common signal switch circuit 17. With the switching TFTs 43 in the switch circuit 15 turned on, the touch signals supplied to the first ends of the source lines 27 are transmitted to the touch lines 31 via the source lines 27 and the second ends of the source lines 27. Because the common switching TFTs 48 and 49 in the common signal switch circuit 17 are not turned on, the common signals are not supplied to the common lines 18 and the touch lines 31 by the common single source 16. The touch signals are supplied to the touch electrodes 30 connected to the touch lines 31. When the user performs a positon input operation, the touch electrode 30 close to the finger and the finger form a capacitor. Therefore, a position of input by the finger can be detected based on a variation in capacitance.

As describe earlier, the liquid crystal display device 10 (the display device) according to this embodiment includes the source lines 27 (the image lines), the driver 12 (the signal source), the touch lines 31 (the position detecting lines), and the switch circuit 15. The source lines 27 are disposed in the display area AA in which the images are displayed. The driver 12 is connected to the source lines 27 and configured to supply the image signals and the touch signals (the position detecting signals) to the source lines 27 with time-division. The touch lines 31 are disposed in the display area AA. The switch circuit 15 is disposed on the opposite side from the driver 12 relative to the display area outside the display area AA and connected to the source lines 27 and the touch lines 31. The switch circuit 15 electrically connects the source lines 27 and the touch lines 31 in synchronization with the feeding of the touch signals to the source lines 27 by the driver 12.

According to the configuration, the image signals and the touch signals are supplied to the source lines 27 in the display area AA by the driver 12 outside the display area AA with time-division. The switch circuit outside the display area AA electrically connects the source lines 27 and the touch lines 31 in synchronization with the feeding of the touch signals to the source lines 27 by the driver 12. The touch signals are supplied to the touch lines 31 via the source lines 27. With the source lines 27 used for transmission of the touch signals in addition to the transmission of the image signals, the switch circuit 15 can be disposed on the opposite side from the driver 12 relative to the display area AA. In comparison to the conventional configuration in which the switch circuit is disposed between the selector and the display circuit, the width of the section of the frame on the driver 12 side relative to the display area AA can be reduced because the switch circuit 15 does not exist between the driver 12 and the display area AA.

The common signal source 16 is disposed outside the display area AA and configured to supply the common signals. The common signal switch circuit 17 is disposed outside the display area AA and configured to electrically connect the touch lines 31 and the common signal source 16 in synchronization with the feedings of the image signals to the source lines 27 by the driver 12 connected to the touch lines 31 and the common signal source 16. The common signal switch circuit 17 outside the display area AA electrically connects the touch lines 31 and the common signal source 16 in synchronization with the feedings of the touch signals to the source lines 27 by the driver 12. The common signals are supplied to the touch lines 31 by the common signal source 16. The touch lines 31 are used for transmission of the common signals in addition to the transmission of the touch signals.

The common signal source 16 and the common signal switch circuit 17 are disposed on the same side on which the switch circuit 15 is disposed relative to the display area AA. According to the configuration, the width of the section of the frame on the driver 12 side relative to the display area AA can be maintained at the minimum while a signal supplying function to supply the common signals to the touch lines 31 is maintained.

The switch circuit 15 is disposed adjacent to the display area AA relative to the common signal switch circuit 17 and the common signal source 16. According to the configuration, the source lines 27 and the touch lines 31 that are electrically connected by the switch circuit 15 are not disposed to cross the common signal switch circuit 17 and the common signal source 16. Therefore, the load capacitances of the source lines 27 and the touch lines 31 are reduced and thus the touch signals transmitted therethrough are less likely to be rounded.

The common signal switch circuit 17 is disposed adjacent to the display area AA relative to the common signal source 16. In comparison to the configuration in which the common signal source is disposed adjacent to the display area AA relative to the common signal switch circuit 17, the length of sections of the touch lines 31 connected to the common signal switch circuit 17 can be reduced. Therefore, the common signals transmitted through the touch lines 31 are less likely to be rounded.

The common lines 18 are disposed in the display area AA and connected to the common signal switch circuit 17. The common signal switch circuit 17 electrically connects the common signal source 16 and the common lines 18 in synchronization with the feedings of the image signals to the source lines 27 by the driver 12. According to the configuration, the common signals supplied by the common signal source 16 are transmitted not only to the touch lines 31 but also to the common lines 18 by the common signal switching circuit 17. Therefore, the common signals are less likely to be rounded.

The number of the touch lines 31 is smaller than the number of the source lines 27. The touch lines 31 are disposed in the layer in which the common lines 18 are disposed. The source lines 27 include the first source lines 27α and the second source lines 27β. The first source lines 27α are disposed to overlap the touch lines 31 via the first interlayer insulator 37 and the planarization film 38 (the insulator). The second source lines 27β are disposed to overlap the common lines 18 via the first interlayer insulator 37 and the planarization film 38 (the insulator). The common lines 18 overlap the second source lines 27β via the first interlayer insulator 37 and the planarization film 38 because the number of the touch lines 31 is smaller than the number of the source lines 27. The touch lines 31 provided in the smaller number in comparison to the source lines 27 are disposed to overlap the first source lines 27α via the first interlayer insulator 37 and the planarization film 38. The lines 18, 27α and 27β can be efficiently arranged in the display area AA. This configuration is preferable for improving brightness of the imaged displayed in the display area AA.

The first source lines 27α are connected to the switch circuit 15 but the second source lines 27β are not connected to the switch circuit 15. The driver 12 supplies the image signals and the touch signals to the first source lines with time-division and only the image signals to the second source lines 27β. Because the first source lines 27α overlapping the touch lines 31 are connected to the switch circuit 15, the touch signals supplied to the first source lines 27α by the driver 12 are efficiently transmitted to the touch lines 31 via the switch circuit 15. The driver 12 supplies only the image signals to the second source lines 27β overlapping the common lines 18.

The number of the first source lines 27α is equal to the number of the touch lines 31. The number of the second source lines 27β is equal to the number of the common lines 18. All of the source lines 27 overlap the touch lines 31 or the common lines 18. Therefore, the load capacitances of the source lines 27 are equalized. The number of the common lines is at the maximum while the lines 18, 27α and 27β are efficiently arranged in the display area AA. Therefore, the common signals are less likely to be rounded.

The touch lines 31 and the common lines 18 are disposed to overlap the first source lines 27α and the second source lines 27β for the entire lengths in the display area AA. According to the configuration, the load capacitances of the first source lines 27α and the second source lines 27β are equalized.

The pixel electrodes 24 are connected to the source lines 27. The common electrode 25 is disposed to overlap the pixel electrodes 24 via the second interlayer insulator 41 (the insulator). The common electrode 25 includes the touch electrodes 30 (the position detecting electrodes) connected to the touch lines 31. The touch electrodes 30 and the position input member by which the position input operations are performed form the capacitors. The touch electrodes 30 are for detection of positions of inputs by the position input member. According to the configuration, the pixel electrodes 24 are charged based on the image signals transmitted through the source lines 27. The common signals that are supplied to the touch lines 31 by the common signal source 16 via the common signal switch circuit 17 in synchronization with the feedings of the image signals to the source lines 27 by the driver 12 and transmitted through the touch lines 31 are supplied to the common electrode 25. Potential differences may be created between the pixel electrodes 24 and the common electrode 25 overlapping the pixel electrodes 24 via the second interlayer insulator 41 based on the potentials at the pixel electrodes 24. The image display is performed using the potential differences. The touch signals that are supplied to the source lines 27 by the driver 12 via the switch circuit 15 and transmitted through the touch lines 31 via the image signals are supplied to the touch electrodes 30 included in the common electrode 25. When the capacitors are formed between the touch electrodes 30 and the position input member by which the position input operations are performed, the positions of inputs by the position input member are detected.

Second Embodiment

A second embodiment of the technology described herein will be described with reference to FIGS. 13 to 16. The second embodiment includes a common signal source 116 and a common signal switch circuit 117 arranged differently from the first embodiment. Components, functions, and effects similar to those of the first embodiment previously described will not be described.

Figure 13:
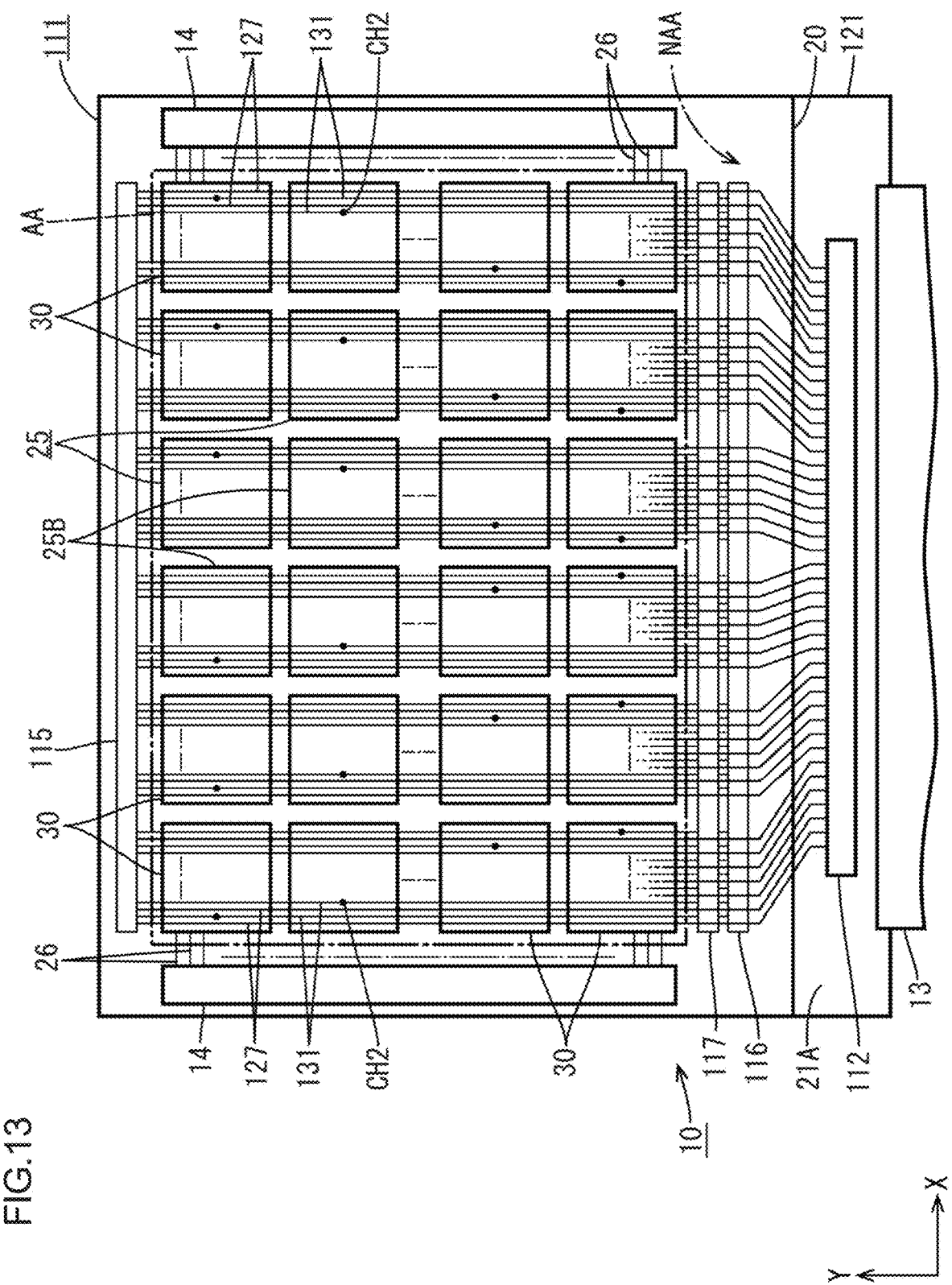
FIG. 13 is a plan view of a liquid crystal panel according to a second embodiment illustrating source lines, touch electrodes, and touch lines.

FIG. 13 is a schematic plan view of a liquid crystal panel 111. As illustrated in FIG. 13, a switch circuit 115 in this embodiment is disposed on an opposite side from a driver 112 relative to the display area AA in the Y-axis direction. The common signal source 116 and the common signal switch circuit 117 are disposed on the side on which the driver 12 is disposed relative to the display area AA in the Y-axis direction. The display area AA is disposed between the switch circuit 115 and the common signal source 116 or the common signal switch circuit 117. In comparison to the first embodiment, a width of a section of a frame on the opposite side from the driver 112 relative to the display area AA in the Y-axis direction can be reduced.

Figure 14:
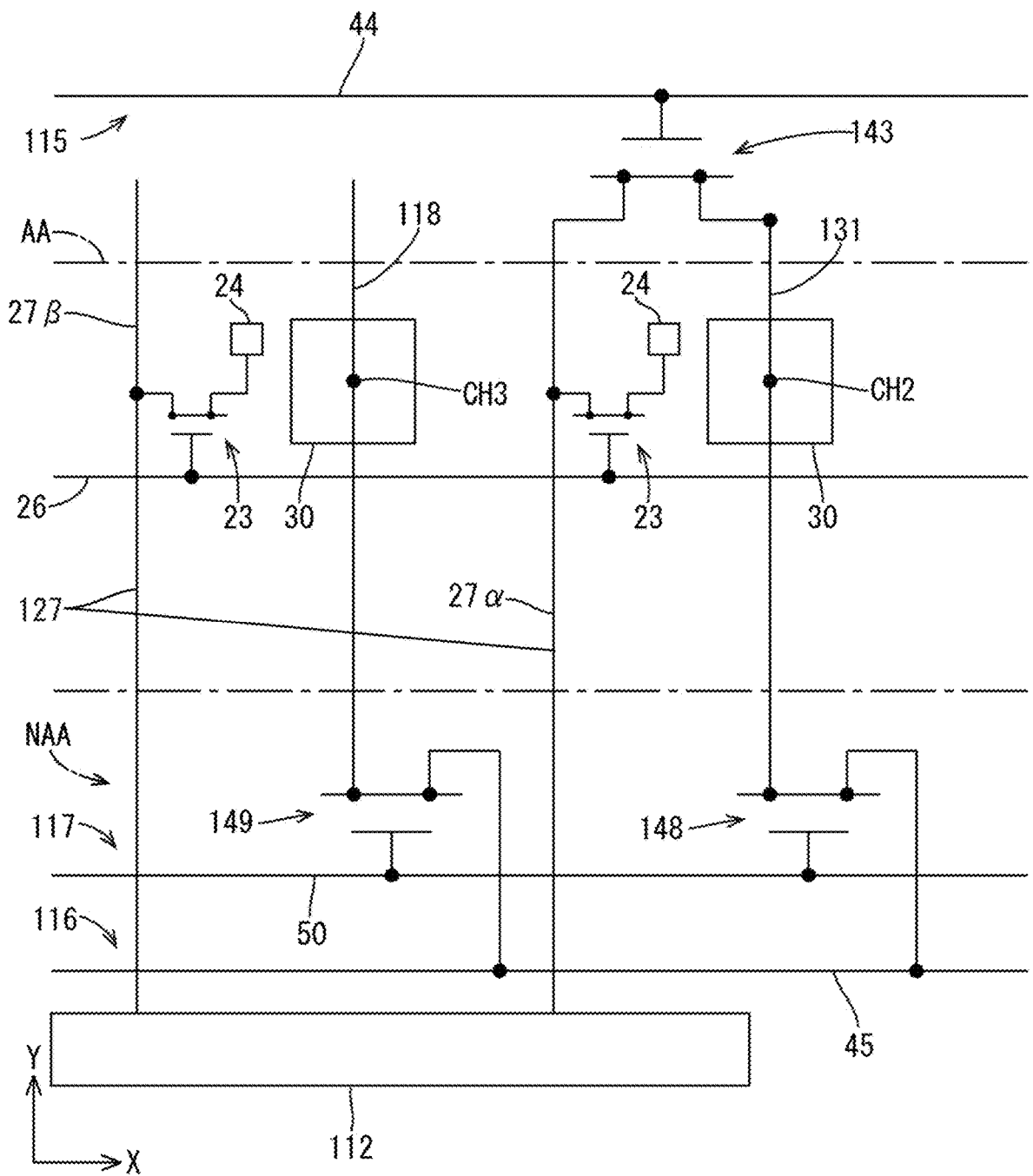
FIG. 14 is a circuit diagram illustrating an electrical configuration of an array substrate included in the liquid crystal panel.

FIG. 14 is a circuit diagram schematically illustrating an electrical configuration of an array substrate 121. As illustrated in FIG. 14, the common signal source 116 and the common signal switch circuit 117 are sandwiched between the driver 112 and the display area AA. The common signal switch circuit 117 is disposed adjacent to the display area AA and closer to the display area AA relative to the common signal source 116. The common signal source 116 is disposed adjacent to the driver 112 and away from the display area AA relative to the common signal switch circuit 117. The arrangement of the switch circuit 115 is similar to that of the first embodiment.

Figure 15:
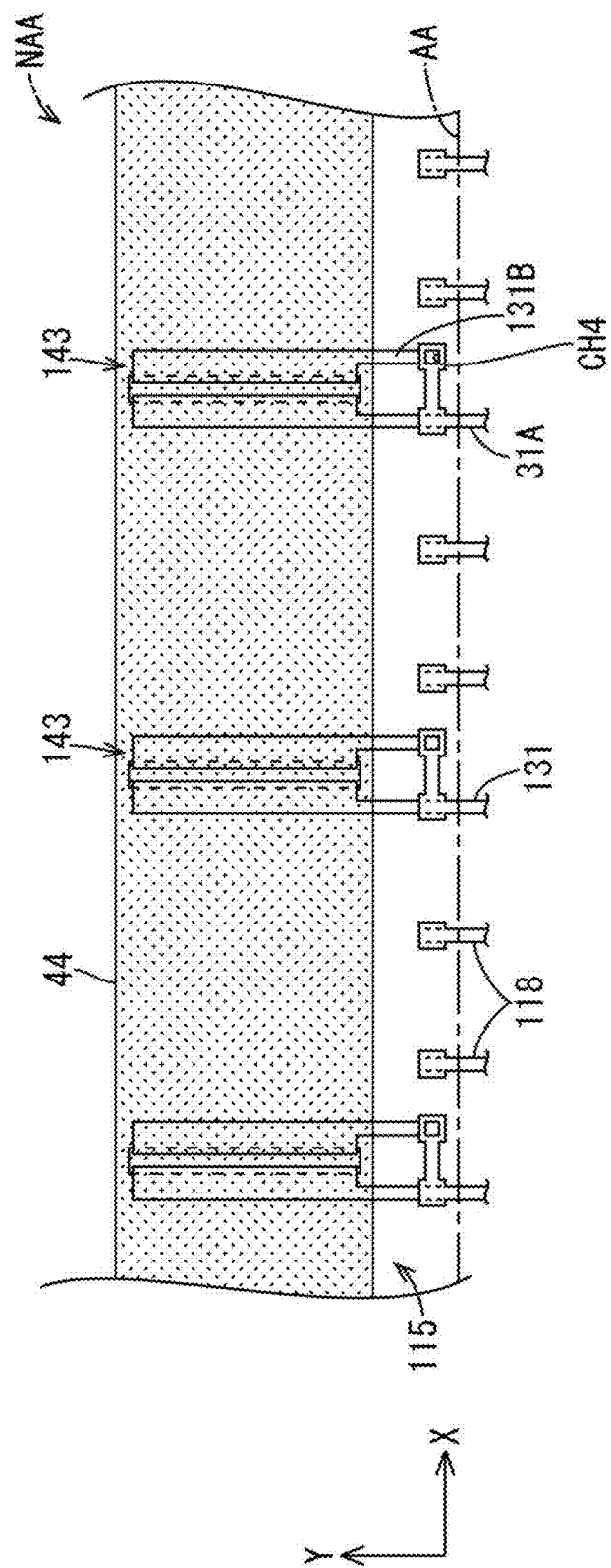
FIG. 15 is a plan view of a section of the array substrate including a switch circuit.
Figure 16:
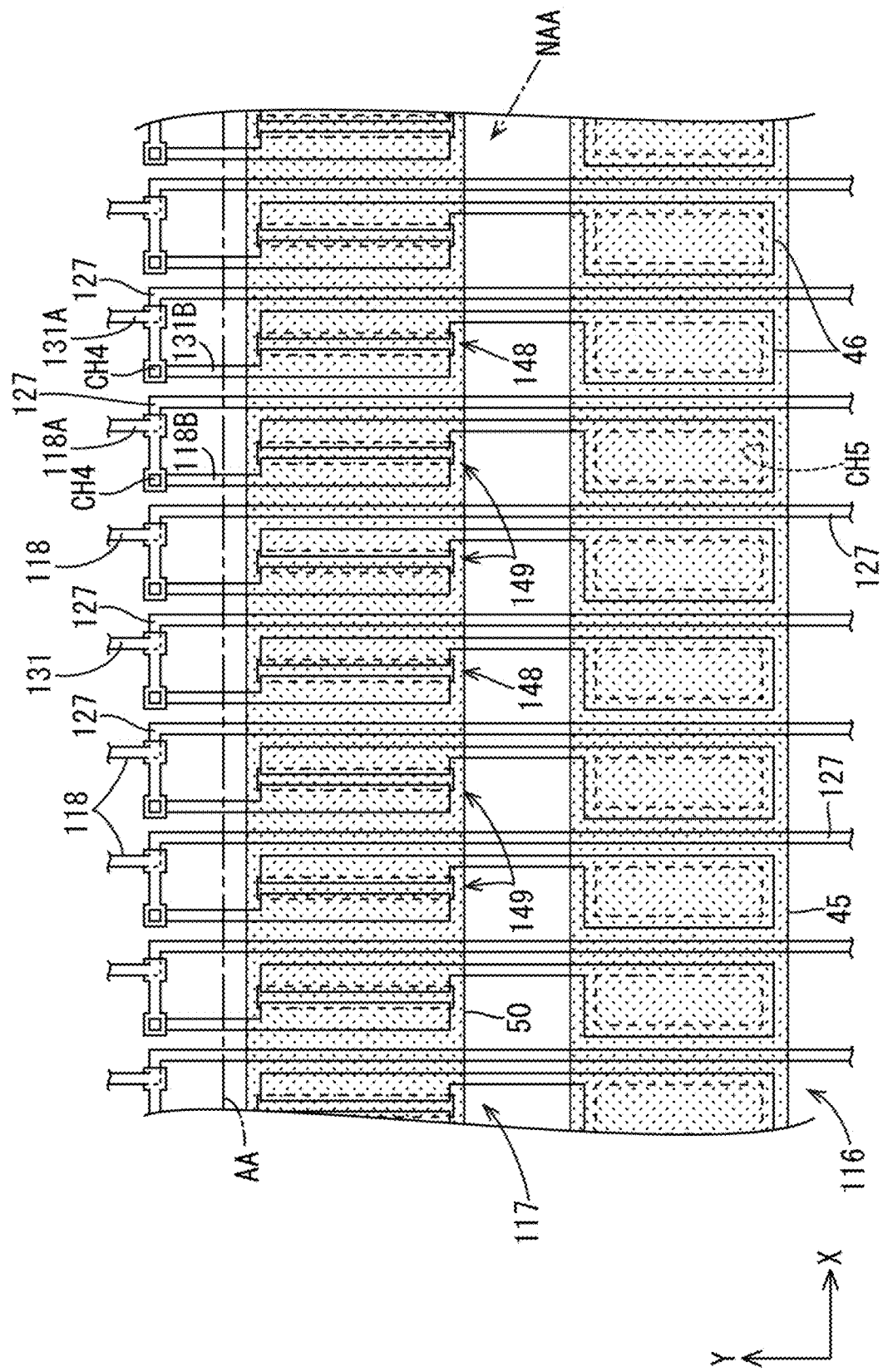
FIG. 16 is a plan view of a section of the array substrate including a common signal source and a common signal switch circuit.

FIG. 15 is a plan view of a section of the array substrate 121 including the switch circuit 115. As illustrated in FIG. 15, the switch circuit 115 is disposed adjacent to the display area AA. The common signal source 116 and the common signal switch circuit 117 are not disposed on an opposite side from the display area AA. Common lines 118 do not cross the switch circuit 115. Touch lines 131 include connecting portions 131B at ends on an opposite side from the driver 112. The connecting portions 131B are connected only to switching TFTs 143 in the switch circuit 115. The connecting portions 131B are not connected to the common signal switch circuit 117. FIG. 16 is a plan view of a section of the array substrate 121 including the common signal source 116 and the common signal switch circuit 117. As illustrated in FIG. 16, the switch circuit 115 does not exist between the display area AA and the common signal source 116 or the common signal switch circuit 117. The common lines 118 and the touch lines 131 include ends on the driver 112 side connected to first common signal switching TFTs 148 and second common signal switching TFTs 149 in the common signal switch circuit 117. Large portions of the common lines 118 and the touch lines 131 are disposed in the display area AA. The common lines 118 include body portions 118A and connecting portions 118B. The body portions 118A include end sections that are drawn to the non-display area NAA. The touch lines 131 include body portions 131A and connecting portions 131B. The body portions 131A include end sections that are drawn to the non-display area NAA. The body portions 118A and 131A are prepared from the third metal film. The connecting portions 118B and 131B are prepared from the second metal film. The connecting portions 118B are connected to the first common signal switching TFTs 148. The connecting portions 131B are connected to the second common signal switching TFTs 149. The body portions 118A of the common lines 118 are bent such that the end sections thereof do not overlap source lines 127 with which the common lines 118 overlap and ends of the end sections are disposed to overlap the connecting portions 118B. The body portions 131A of the touch lines 131 are bent such that the end sections thereof do not overlap the source lines 127 with which the touch lines 131 overlap and ends of the end sections are disposed to overlap the connecting portions 131B. Sections of the body portions 118A and the connecting portions 118B of the common lines 118 overlapping each other are connected to each other via the connecting portion contact holes CH4 in the first interlayer insulator and the planarization film disposed between the first metal film and the second metal film. Sections of the body portions 131A and the connecting portions 131B of the touch lines 131 overlapping each other are connected to each other via the connecting portion contact holes CH4 in the first interlayer insulator and the planarization film disposed between the first metal film and the second metal film. The source lines 127 are prepared from the second metal film 36 for the entire length. The source lines 127 are routed to pass through spaces between the first common signal switching TFTs 148 or the second common signal switching TFTs 149 adjacent to each other in the X-axis direction and connected to the driver 112.

In this embodiment, the common signal source 116 and the common signal switch circuit 117 are disposed on the side on which the driver 112 is disposed relative to the display area AA. According to the configuration, the width of the section of the frame on the switch circuit 115 side relative to the display area AA can be reduced while the signal supplying function for supplying the common signals to the touch lines 131 can be maintained.

Third Embodiment

A third embodiment of the technology described herein will be described with reference to FIGS. 17 and 18. The third embodiment includes a secondary common signal source 51 and a secondary common signal switch circuit 52 in addition to the configuration of the first embodiment. Components, functions, and effects similar to those of the first embodiment previously described will not be described.

Figure 17:
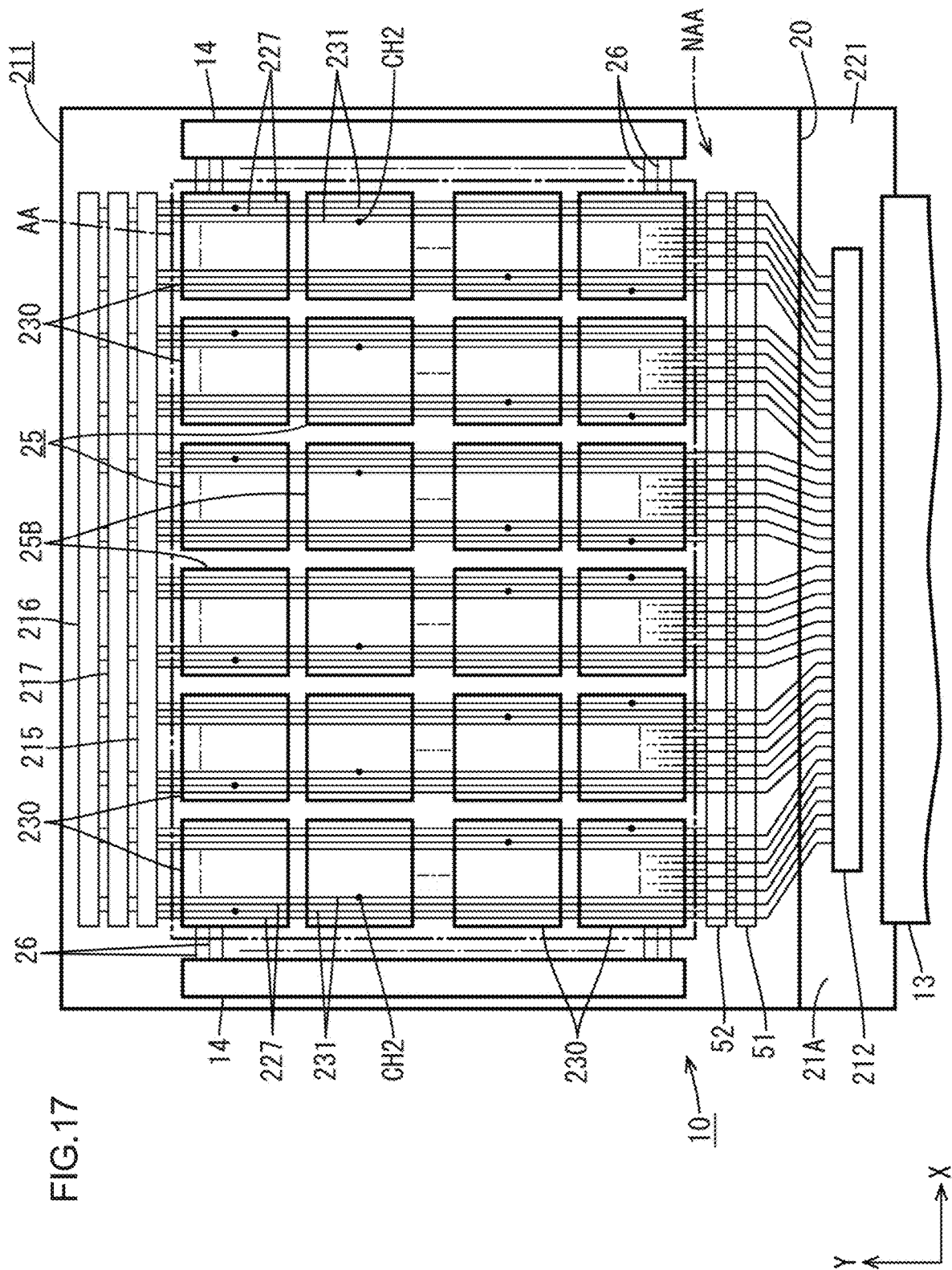
FIG. 17 is a plan view of a liquid crystal panel according to a third embodiment illustrating source lines, touch electrodes, and touch lines.

FIG. 17 is a schematic plan view of a liquid crystal panel 211. As illustrated in FIG. 17, a common signal source 216 and a common signal switch circuit 217 are disposed on a side on which a switch circuit 215 is disposed relative to the display area AA in the Y-axis direction, similar to the first embodiment. The secondary common signal source 51 and the secondary common signal switch circuit 52 are disposed on the side on which a driver 212 is disposed (on an opposite from the switch circuit 215) relative to the display area AA in the Y-axis direction on an array substrate 221 in this embodiment.

Figure 18:
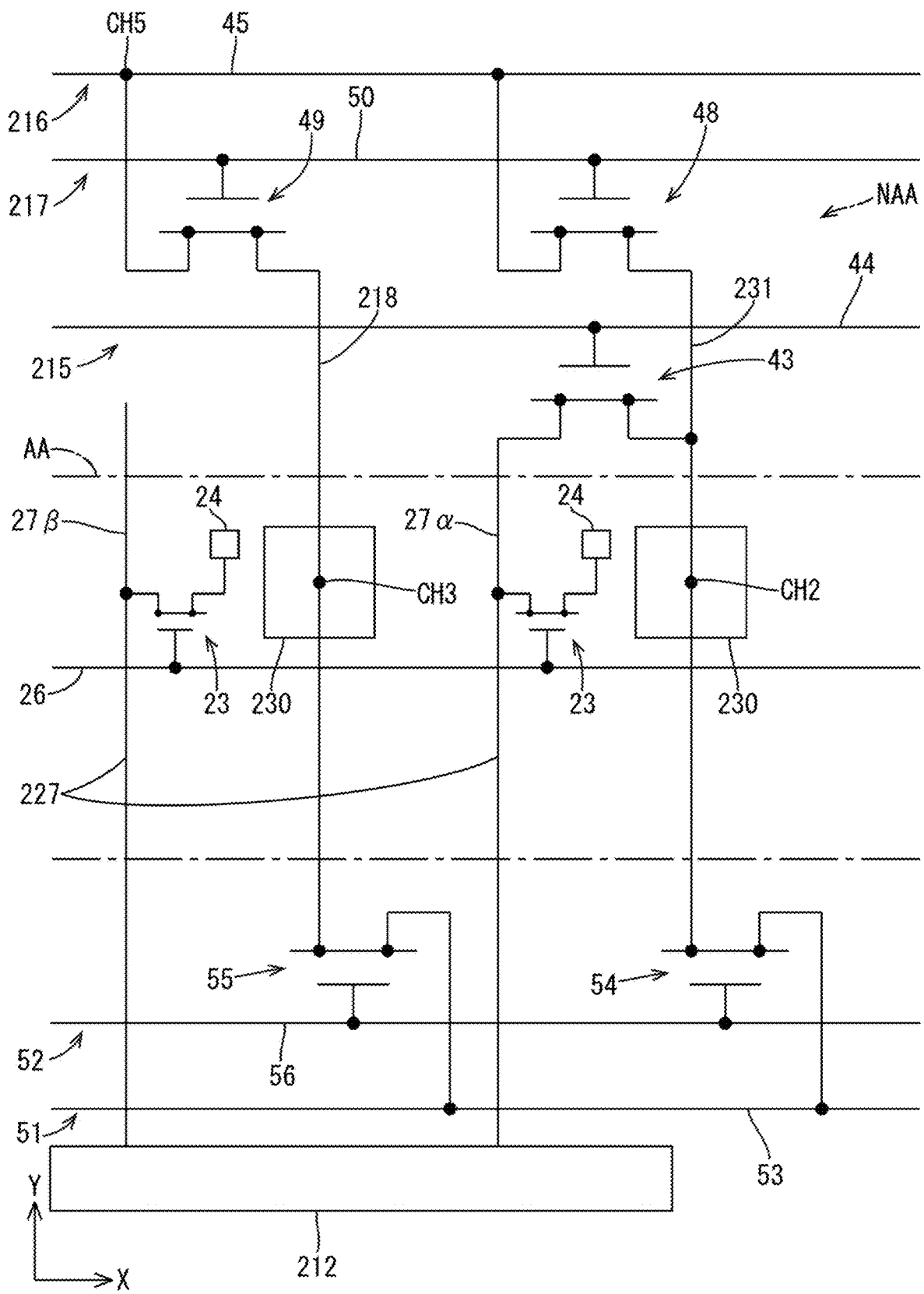
FIG. 18 is a circuit diagram illustrating an electrical configuration of an array substrate included in the liquid crystal panel.

FIG. 18 is a circuit diagram schematically illustrating an electrical configuration of the array substrate 221. As illustrated in FIG. 18, the secondary common signal source 51 is connected to the secondary common signal switch circuit 52 and configured to supply common signals. The secondary common signal source 51 has a configuration similar to the configuration of the common signal source 216 in the first embodiment. The secondary common signal source 51 includes at least second common main lines 53. The secondary common signal switch circuit 52 is connected to the secondary common signal source 51, common lines 218, and touch lines 231. The secondary common signal switch circuit 52 electrically connects the secondary common signal source 51 to the common lines 218 and the touch lines 231 in synchronization with feedings of image signals to source lines 227 by the driver 212. The secondary common signal switch circuit 52 has a configuration similar to the configuration of the common signal switch circuit 217 in the first embodiment. The secondary common signal switch circuit 52 includes at least secondary first common signal switching TFTs 54, secondary second signal switching TFTs 55, and secondary common signal switching lines 56. The touch lines 231 include first ends on an opposite side from the driver 212 and second ends on the driver 212 side. The first ends are connected to the switch circuit 215 and the common signal switch circuit 217. The second ends are connected to the secondary common signal switch circuit 52. The common lines 218 include first ends on the opposite side from the driver 212 and second ends on the driver 212 side. The first ends are connected to the common signal switch circuit 217. The second ends are connected to the secondary common signal switch circuit 52. During the display periods, the common signals supplied by the common signal source 216 and the secondary common signal source 51 in synchronization with feedings of the image signals to the source lines 227 by the driver 212. The common signals are input to first and second ends of the common lines 218 and the touch lines 231 via the common signal switch circuit 217 and the secondary common signal switch circuit 52. In comparison to the configurations in which the common signals are input to only the first ends or the second ends of the common lines and the touch lines as in the first and the second embodiments, the common signals are less likely to be rounded due to the line resistances of the common lines 218 and the touch lines 231. Therefore, variations in reference voltage are less likely to occur at the touch electrodes disposed in the display area AA and thus the display quality improves. This configuration is preferable for large screen displays.

In this embodiment, the common signal source 216 and the common signal switch circuit 217 are disposed on the side on which the switch circuit 215 is disposed relative to the display area AA. The secondary common signal source 51 is disposed on the side on which the driver 212 is disposed relative to the display area AA outside the display area AA. The secondary common signal source 51 is configured to supply the common signals. The secondary common signal switch circuit 52 is disposed on the side on which the driver 212 is disposed relative to the display area AA outside the display area AA. The secondary common signal switch circuit 52 is connected to the touch lines 231 and the secondary common signal source 51. The secondary common signal switch circuit 52 electrically connects the touch lines 231 and the secondary common signal source 51 in synchronization with the feedings of the image signals to the source lines 227 by the driver 212. The common signal switch circuit 217 disposed outside the display area AA electrically connects the common signal source 216 to the touch lines 231 in synchronization with the feedings of the touch signals to the source lines 227 by the driver 212. The secondary common signal switch circuit 52 disposed outside the display area AA electrically connects the secondary common signal source 51 to the touch lines 231 in synchronization with the feedings of the touch signals to the source lines 227 by the driver 212. The common signals are supplied to the touch lines 231 by the common signal source 216 and the secondary common signal source 51. Therefore, the common signals transmitted through the touch lines 231 are less likely to be rounded due to the line resistances of the touch lines 231. This configuration is preferable for increasing in size.

Other Embodiments

The technology described herein is not limited to the embodiments described above and illustrated by the drawings. For example, the following embodiments will be included in the technical scope of the technology described herein.

(1) In each of the above embodiments, the common lines are connected to the common signal switch circuit but not to the switch circuit. However, the common lines may be omitted. In such a configuration, the touch lines connected to the switch circuit and the common signal switch circuit may be disposed to overlap all of the source lines. During the sensing periods, the touch signals may be supplied to all of the source lines or some of the source lines. Alternatively, the touch lines may be disposed to overlap some of the source lines.

(2) If the common lines are omitted as described in (1), dummy common lines prepared from the third metal film from which the touch lines are prepared may be provided to overlap the touch lines with which the source lines do not overlap. The dummy common lines may not be connected to the common signal switch circuit and may be electrically isolated from the common signal switch circuit. Other features of the dummy common lines may be the same as the features of the common lines in the embodiments described above.

(3) In each of the above embodiments, the touch lines or the common lines are disposed to overlap all of the source lines. However, the touch lines and the common lines may not overlap some of the source lines. The dummy common lines described in (2) may be disposed to overlap the source lines with which the touch lines and the common lines do not overlap.

(4) In each of the above embodiments, the touch lines are connected to the switch circuit and the common signal switch circuit. However, the touch lines may be connected to the switch circuit but not to the common signal switch circuit. In such a configuration, the touch lines may not have common signal transmitting functions and may have only touch signal transmitting functions. In such a configuration, the common signals supplied by the common signal switch circuit are transmitted to the touch electrodes through the common lines.

(5) In each of the above embodiments, the common signal switch circuit is disposed adjacent to the display area and the common signal source is disposed away from the display area. However, the common signal switch circuit may be disposed away from the display area and the common signal source may be disposed adjacent to the display area.

(6) In a first or a third embodiment, the switch circuit is disposed closer to the display area relative to the common signal source and the common signal switch circuit. However, the switch circuit may be disposed between the common signal source and the common signal switch circuit. The switch circuit may be disposed on an opposite side from the display area relative to the common signal source and the common signal switch circuit.

(7) In the third embodiment, the secondary common signal switch circuit is disposed adjacent to the display area and the secondary common signal source is disposed away from the display area. However, the secondary common signal switch circuit may be disposed away from the display area and the second common signal source may be disposed adjacent to the display area.

(8) In each of the above embodiments, the common lines and the touch lines are disposed to overlap the source lines for the entire length. However, the common lines and the touch lines may be disposed to overlap sections of the source lines in the extending direction.

(9) In each of the above embodiments, the common lines and the touch lines are disposed to overlap the source lines. However, the common lines and the touch lines may be disposed not to overlap the source lines. In such a configuration, the common lines and the touch lines may be prepared from the second metal film from which the source lines are prepared.

(10) In each of the above embodiments, the bottom gate type TFTs are used for the TFTs. However, top gate type TFTs may be used.

(11) In each of the above embodiments, the number of colors of the color filters and the pixels is three. However, the number of colors may be altered where appropriate.

(12) The materials of the metal films, the insulators, the semiconductor film, and the transparent electrode films in the array substrate may be altered from those of the above embodiments. The number of layers of the insulators in the array substrate may be altered where appropriate.

(13) In each of the above embodiments, a single driver is mounted on the array substrate. However, the number of drivers mounted on the array substrate may be altered where appropriate.

(14) In each of the above embodiments, the gate circuits are provided on the array substrate. However, the gate circuits may be omitted and a gate driver having a similar function as the gate circuits may be mounted on the array substrate. The gate circuits may be disposed on one side of the array substrate.

(15) The two-dimensional shape of the pixel overlapping holes in the common electrodes may be altered from that in each of the above embodiments where appropriate. The two-dimensional shape of the pixel overlapping holes may be a V shape. Then number and the intervals of the pixel overlapping holes may be altered where appropriate.

(16) In each of the above embodiments, the TFTs are two-dimensionally arranged in the matrix on the array substrate. However, the TFTs may be two-dimensionally arranged in zigzags. In such a configuration, pixel electrodes in pixels that exhibit different colors may be connected to each source line via TFTs arranged in zigzags.

(17) In each of the above embodiments, the light blocking portion is provided on the CF substrate. However, the light blocking portion may be provided on the array substrate.

(18) The semiconductor film from which the channels of the TFTs are prepared may be made of polysilicon other than the material used in each of the above embodiments. In such a configuration, bottom gate type TFTs may be used for the TFTs or top gate type TFTs including light blocking films below channels (on a side on which the backlight unit is disposed).

(19) In each of the above embodiments, the touch panel pattern uses the projected capacitance method. However, the touch panel pattern may use a mutual capacitance method.

(20) In each of the above embodiments, the transmissive liquid crystal panel is provided as an example. However, the technology described herein may be applied to reflective liquid crystal panels and semitransmissive liquid crystal panels.

(21) In each of the above embodiments, the two-dimensional shape of the liquid crystal display device (the liquid crystal panel or the backlight unit) is the horizontally-long rectangular shape. However, the two-dimensional shape of the liquid crystal display device may be vertically-long rectangular shape, a circular shape, a semicircular shape, an oval shape, an elliptic shape, a trapezoidal shape, or other shapes.

(22) In each of the above embodiment sections, the liquid crystal display device including the liquid crystal panel for a display panel is described. However, an organic EL display device including an organic EL display panel for a display panel may be used.

(23) In each of the above embodiments, the pixel electrodes are prepared from the first transparent electrode film and the common electrodes and the touch electrodes are prepared from the second transparent electrode film. However, the pixel electrodes may be prepared from the second transparent electrode film and the common electrodes and the touch electrodes may be prepared from the first transparent electrode film. In such a configuration, the pixel electrodes may include holes for control of orientation of the liquid crystal molecules.

The invention claimed is:

1. A display device comprising:
   image lines disposed in a display area in which an image is displayed;
   a signal source disposed outside the display area and connected to the image lines, the signal source being configured to supply image signals and position detecting signals to the image lines with time-division;
   position detecting lines disposed in the display area; and
   a switch circuit disposed on an opposite side from the signal source relative to the display area outside the display area and connected to the image lines and the position detecting lines, the switch circuit being configured to electrically connect the image lines and the position detecting lines in synchronization with feedings of the position detecting signals to the image lines by the signal source;
   a common signal source disposed outside the display area and configured to supply common signals;
   a common signal switch circuit disposed outside the display area and connected to the position detecting lines and the common signal source, the common signal switch circuit being configured to electrically connect the position detecting lines and the common signal source in synchronization with the feeding of the image signals to the image lines by the signal source; wherein
   the common signal source and the common signal switch circuit are disposed on a side on which the switch circuit is disposed relative to the display area; and
   the switch circuit is disposed closer to the display area relative to the common signal switch circuit and the common signal source.

2. The display device according to claim 1, wherein
the common signal source and the common signal switch circuit are disposed on a side on which the switch circuit is disposed relative to the display area, and
the display device further comprises:
   a secondary common signal source disposed on a side on which the signal source is disposed relative to the display area outside the display area and configured to supply the common signals; and
   a secondary common signal switch circuit disposed on a side on which the signal source is disposed relative to the display area outside the display area and connected to the position detecting lines and the secondary signal source, the secondary common signal switch circuit being configured to electrically connect the position detecting lines and the secondary common signal source in synchronization with the feeding of the image signals to the image lines by the signal source.

3. The display device according to claim 1, wherein the common signal switch circuit is disposed closer to the display area relative to the common signal source.

4. The display device according to claim 1, further comprising:
   pixel electrodes connected to the image lines; and
   a common electrode disposed to overlap the pixel electrodes via an insulator, the common electrode including position detecting electrodes connected to the position detecting lines, each of the position detecting electrodes being configured to form a capacitor with a position input member by which a position input operation is performed to detect a position of input by the position input member.

5. A display device, comprising:
   image lines disposed in a display area in which an image is displayed;
   a signal source disposed outside the display area and connected to the image lines, the signal source being configured to supply image signals and position detecting signals to the image lines with time-division;
   position detecting lines disposed in the display area; and
   a switch circuit disposed on an opposite side from the signal source relative to the display area outside the display area and connected to the image lines and the position detecting lines, the switch circuit being configured to electrically connect the image lines and the position detecting lines in synchronization with feedings of the position detecting signals to the image lines by the signal source;
   a common signal source disposed outside the display area and configured to supply common signals; and
   a common signal switch circuit disposed outside the display area and connected to the position detecting lines and the common signal source, the common signal switch circuit being configured to electrically connect the position detecting lines and the common signal source in synchronization with the feeding of the image signals to the image lines by the signal source;
   wherein the common signal source and the common signal switch circuit are disposed on a side on which the signal source is disposed relative to the display area.

6. The display device according to claim 5, wherein
the common signal source and the common signal switch circuit are disposed on a side on which the switch circuit is disposed relative to the display area, and
the display device further comprises:
   a secondary common signal source disposed on a side on which the signal source is disposed relative to the display area outside the display area and configured to supply the common signals; and
   a secondary common signal switch circuit disposed on a side on which the signal source is disposed relative to the display area outside the display area and connected to the position detecting lines and the secondary signal source, the secondary common signal switch circuit being configured to electrically connect the position detecting lines and the secondary common signal source in synchronization with the feeding of the image signals to the image lines by the signal source.

7. The display device according to claim 5, wherein the common signal switch circuit is disposed closer to the display area relative to the common signal source.

8. The display device according to claim 5, further comprising:
   pixel electrodes connected to the image lines; and
   a common electrode disposed to overlap the pixel electrodes via an insulator, the common electrode including position detecting electrodes connected to the position detecting lines, each of the position detecting electrodes being configured to form a capacitor with a position input member by which a position input operation is performed to detect a position of input by the position input member.

9. A display device, comprising:
   image lines disposed in a display area in which an image is displayed;
   a signal source disposed outside the display area and connected to the image lines, the signal source being configured to supply image signals and position detecting signals to the image lines with time-division;
   position detecting lines disposed in the display area; and
   a switch circuit disposed on an opposite side from the signal source relative to the display area outside the display area and connected to the image lines and the position detecting lines, the switch circuit being configured to electrically connect the image lines and the position detecting lines in synchronization with feedings of the position detecting signals to the image lines by the signal source;
   a common signal source disposed outside the display area and configured to supply common signals;
   a common signal switch circuit disposed outside the display area and connected to the position detecting lines and the common signal source, the common signal switch circuit being configured to electrically connect the position detecting lines and the common signal source in synchronization with the feeding of the image signals to the image lines by the signal source; and
   common lines disposed in the display area and connected to the common signal switch circuit, wherein
   the common signal switch circuit is configured to electrically connect the common signal source and the common signal lines in synchronization with the feeding of the image signals to the image lines by the signal source.

10. The display device according to claim 9, wherein
a number of the position detecting lines is smaller than a number of the image lines,
the position detecting lines are disposed in a layer in which the common lines are disposed, and the image lines include first image lines disposed to overlap the position detecting lines via an insulator and second image lines disposed to overlap the common lines via the insulator.

11. The display device according to claim 10, wherein
the first image lines are connected to the switch circuit,
the second image lines are not connected to the switch circuit,
the signal source is configured to supply the image signals and the position detecting signals to the first image lines with time-division, and
the signal source is configured to supply only the image signals to the second image lines.

12. The display device according to claim 10, wherein
a number of the first image lines is equal to a number of the position detecting lines, and
a number of the second image lines is equal to a number of the common lines.

13. The display device according to claim 10, wherein the position detecting lines and the common lines are disposed to overlap the first image lines and the second image lines for entire lengths of the first image lines and the second image lines in the display area.

14. The display device according to claim 9, wherein
the common signal source and the common signal switch circuit are disposed on a side on which the switch circuit is disposed relative to the display area, and
the display device further comprises:
  a secondary common signal source disposed on a side on which the signal source is disposed relative to the display area outside the display area and configured to supply the common signals; and
  a secondary common signal switch circuit disposed on a side on which the signal source is disposed relative to the display area outside the display area and connected to the position detecting lines and the secondary signal source, the secondary common signal switch circuit being configured to electrically connect the position detecting lines and the secondary common signal source in synchronization with the feeding of the image signals to the image lines by the signal source.

15. The display device according to claim 9, wherein the common signal switch circuit is disposed closer to the display area relative to the common signal source.

16. The display device according to claim 9, further comprising:
  pixel electrodes connected to the image lines; and
  a common electrode disposed to overlap the pixel electrodes via an insulator, the common electrode including position detecting electrodes connected to the position detecting lines, each of the position detecting electrodes being configured to form a capacitor with a position input member by which a position input operation is performed to detect a position of input by the position input member.

* * * * *